US008909399B2

(12) United States Patent
Kato et al.

(10) Patent No.: US 8,909,399 B2
(45) Date of Patent: Dec. 9, 2014

(54) HYBRID VEHICLE AND CONTROL METHOD THEREOF

(75) Inventors: Norihiko Kato, Handa (JP); Kensuke Kamichi, Toyota (JP); Masaya Yamamoto, Kasugai (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/322,340

(22) PCT Filed: May 25, 2009

(86) PCT No.: PCT/JP2009/059500
§ 371 (c)(1),
(2), (4) Date: Nov. 23, 2011

(87) PCT Pub. No.: WO2010/137100
PCT Pub. Date: Dec. 2, 2010

(65) Prior Publication Data
US 2012/0072066 A1 Mar. 22, 2012

(51) Int. Cl.
B60W 10/06 (2006.01)
B60W 10/08 (2006.01)
(Continued)

(52) U.S. Cl.
CPC ......... B60K 6/365 (2013.01); *F16H 2037/0866* (2013.01); *B60W 2510/244* (2013.01);
(Continued)

(58) Field of Classification Search
USPC ............... 180/65.21, 65.265, 65.28, 65.285, 180/65.29; 903/902, 903, 906, 930; 701/22
See application file for complete search history.

(56) References Cited

U.S. PATENT DOCUMENTS 6,209,672 B1 * 4/2001 Severinsky ............... 180/65.23
6,397,963 B1 * 6/2002 Lennevi ................... 180/65.235
(Continued)

FOREIGN PATENT DOCUMENTS

JP 2008-230409 A 10/2008
JP 2009-012593 A 1/2009
(Continued)

OTHER PUBLICATIONS

Japanese Patent Office, International Search Report in International Application No. PCT/JP2009/059500, dated Aug. 25, 2009.

*Primary Examiner* — John Q Nguyen
*Assistant Examiner* — Michael Whalen
(74) *Attorney, Agent, or Firm* — Kenyon & Kenyon LLP

(57) ABSTRACT

In the case that the motor travel priority mode is set and the restriction mode is set as the control mode because of the request of the operation of the engine, the threshold value Peg that is smaller value between the obtained value (kw·Wout) from multiplying the output limit Wout of the battery by the preset conversion factor kw and the preset power Pset that is smaller than the converted output limit Wout of the battery at a normal time is compared with the driving power Pdrv*. The hybrid vehicle is driven with the motor travel in idle operation of the engine when the driving power Pdrv* is not more than the threshold value Peg, and the hybrid vehicle is driven with power from the engine when the driving power Pdrv* is more than the threshold value Peg.

8 Claims, 15 Drawing Sheets

(51) Int. Cl.
  *B60K 6/365* (2007.10)
  *B60L 11/18* (2006.01)
  *B60K 6/547* (2007.10)
  *B60K 6/445* (2007.10)
  *B60L 15/20* (2006.01)
  *B60L 11/14* (2006.01)
  *B60K 6/52* (2007.10)
  *B60W 20/00* (2006.01)
  *F16H 37/08* (2006.01)

(52) U.S. Cl.
  CPC ............ *B60L 11/1809* (2013.01); *B60K 6/547*
        (2013.01); *B60K 6/445* (2013.01); *Y02T*
        *10/6265* (2013.01); *Y02T 10/6269* (2013.01);
        *B60W 2540/16* (2013.01); *B60L 2240/486*
        (2013.01); *B60L 15/2045* (2013.01); *B60W*
        *2540/10* (2013.01); *B60W 10/06* (2013.01);
        *Y02T 90/14* (2013.01); *Y02T 10/7005*
        (2013.01); *Y02T 10/7077* (2013.01); *Y02T*
        *10/6239* (2013.01); *Y02T 10/6286* (2013.01);
        *Y02T 10/7088* (2013.01); *B60L 11/14*
        (2013.01); *B60K 6/52* (2013.01); *B60W 20/00*
        (2013.01); *B60W 10/08* (2013.01); *Y02T*
        *10/7283* (2013.01); *B60W 2540/12* (2013.01);
        *Y10S 903/93* (2013.01)
  USPC ............... 701/22; 180/65.265; 180/65.28;
        180/65.285; 903/930

(56) References Cited

U.S. PATENT DOCUMENTS

| | | | |
|---|---|---|---|
| 6,554,088 B2* | 4/2003 | Severinsky et al. | 180/65.23 |
| 6,657,315 B1* | 12/2003 | Peters et al. | 290/40 C |
| 7,073,615 B2* | 7/2006 | Mack | 180/65.235 |
| 7,104,347 B2* | 9/2006 | Severinsky et al. | 180/65.23 |
| 7,237,634 B2* | 7/2007 | Severinsky et al. | 180/65.23 |
| 7,392,871 B2* | 7/2008 | Severinsky et al. | 180/65.28 |
| 7,398,845 B2* | 7/2008 | Kuang et al. | 180/65.265 |
| 7,455,134 B2* | 11/2008 | Severinsky et al. | 180/65.28 |
| 7,520,353 B2* | 4/2009 | Severinsky et al. | 180/65.28 |
| 7,533,744 B2* | 5/2009 | Mack | 180/65.265 |
| 7,595,606 B2* | 9/2009 | Loubeyre | 320/104 |
| 7,597,164 B2* | 10/2009 | Severinsky et al. | 180/65.27 |
| 8,140,204 B2* | 3/2012 | Okubo et al. | 701/22 |
| 8,214,097 B2* | 7/2012 | Severinsky et al. | 701/22 |
| 8,234,029 B2* | 7/2012 | Ando | 701/22 |
| 8,307,928 B2* | 11/2012 | Mack | 180/65.285 |
| 2001/0039230 A1* | 11/2001 | Severinsky et al. | 477/3 |
| 2003/0217876 A1* | 11/2003 | Severinsky et al. | 180/65.2 |
| 2005/0003925 A1* | 1/2005 | Wakashiro et al. | 477/2 |
| 2006/0100057 A1* | 5/2006 | Severinsky et al. | 477/4 |
| 2006/0132085 A1* | 6/2006 | Loubeyre | 320/104 |
| 2006/0231304 A1* | 10/2006 | Severinsky et al. | 180/65.2 |
| 2006/0231305 A1* | 10/2006 | Severinsky et al. | 180/65.2 |
| 2009/0115349 A1* | 5/2009 | Heap | 318/8 |
| 2009/0131215 A1* | 5/2009 | Shamoto | 477/3 |
| 2009/0150015 A1* | 6/2009 | Okubo et al. | 701/22 |
| 2009/0177345 A1* | 7/2009 | Severinsky et al. | 701/22 |
| 2009/0188733 A1* | 7/2009 | Mack | 180/65.285 |
| 2009/0210108 A1* | 8/2009 | Okubo et al. | 701/22 |
| 2010/0049389 A1* | 2/2010 | Ando | 701/22 |
| 2010/0082188 A1* | 4/2010 | Ando | 701/22 |
| 2010/0106351 A1* | 4/2010 | Hanssen et al. | 701/22 |
| 2010/0280687 A1* | 11/2010 | Tate et al. | 701/22 |
| 2010/0292880 A1* | 11/2010 | McGrogan et al. | 701/22 |
| 2010/0300781 A1* | 12/2010 | Leone | 180/65.29 |
| 2012/0041630 A1* | 2/2012 | Yamamoto et al. | 701/22 |
| 2012/0065828 A1* | 3/2012 | Kato | 701/22 |
| 2012/0072063 A1* | 3/2012 | Kato et al. | 701/22 |
| 2012/0143425 A1* | 6/2012 | Yamamoto et al. | 701/22 |
| 2012/0226404 A1* | 9/2012 | Leone | 701/22 |
| 2012/0277946 A1* | 11/2012 | Yamamoto et al. | 701/22 |

FOREIGN PATENT DOCUMENTS

| | | |
|---|---|---|
| JP | 2009-018713 A | 1/2009 |
| JP | 2009-101735 A | 5/2009 |

* cited by examiner

HYBRID VEHICLE AND CONTROL METHOD THEREOF

CROSS REFERENCE TO RELATED APPLICATION

This is a 371 national phase application of PCT/JP2009/059500 filed May 25, 2009, the content of which is incorporated herein by reference in its entirety.

TECHNICAL FIELD

The present invention relates to a hybrid vehicle and a control method of a hybrid vehicle. More specifically, the invention pertains to a hybrid vehicle having an internal combustion engine capable of outputting power for driving the hybrid vehicle, a motor constructed to input and output power for driving the hybrid vehicle, and a secondary battery designed to transmit electric power to and from the motor, the hybrid vehicle being capable of motor travel where the hybrid vehicle is driven only with input and output power to and from the motor and hybrid travel where the hybrid vehicle is driven with output power from the internal combustion engine and with the input and output power to and from the motor, and a control method of such a hybrid vehicle.

BACKGROUND ART

One proposed hybrid vehicle, which is equipped with an engine that outputs power for driving the vehicle and a motor that outputs power for driving the vehicle, is driven with a higher priority given to a hybrid mode where the vehicle is driven in operation of the engine when a remaining quantity of fuel is not less than a threshold value, and driven with the higher priority given to a motor travel mode where the vehicle is driven with power from the motor in operation stop of the engine when the remaining quantity of fuel is less than the threshold value (see, for example, Patent Document 1). In this hybrid vehicle, it is delayed that the remaining quantity of fuel becomes completely zero according to the above described control.

PRIOR ART DOCUMENT

Patent Document

Patent Document 1: Japanese Patent Laid-Open No. 2009-12593

SUMMARY OF THE INVENTION

In recent hybrid vehicles, a so-called plug-in hybrid vehicle is proposed. The plug-in hybrid vehicle has a capability to charge a secondary battery for supplying electric power to a motor with electric power from an external power supply that is connected to the vehicle in a system-off state of the vehicle. In this plug-in hybrid vehicle, the secondary battery is charged every time the system-off is performed, and it is required to be driven with a higher priority given to a motor travel where the vehicle is driven only with power from the motor in operation stop of the engine in order to lower an accumulated charge amount in the secondary battery by the system-off. However, there is a case that the motor travel is restricted due to a state of the vehicle, a state of the secondary battery, and others.

In a hybrid vehicle and a control method of a hybrid vehicle of the invention, the main object of the invention is to lower an accumulated charge amount of a secondary battery by system-off even when a motor travel is restricted.

In order to attain the main object, the hybrid vehicle and the control method of the hybrid vehicle of the invention have the configurations discussed below.

According to one aspect, the present invention is directed to a hybrid vehicle. The hybrid vehicle, having an internal combustion engine capable of outputting power for driving the hybrid vehicle, a motor constructed to input and output power for driving the hybrid vehicle, and a secondary battery designed to transmit electric power to and from the motor, the hybrid vehicle being capable of motor travel where the hybrid vehicle is driven only with input and output power to and from the motor and hybrid travel where the hybrid vehicle is driven with output power from the internal combustion engine and with the input and output power to and from the motor, the hybrid vehicle having: a charger connected to an external power supply in a system-off state of the hybrid vehicle to charge the secondary battery with electric power from the external power supply; a driving power setting module that sets a driving power required for driving the hybrid vehicle; an accumulated charge ratio calculation module that calculates an accumulated charge ratio based on a state of the secondary battery, the accumulated charge ratio being a ratio of an accumulated charge amount in the secondary battery to a whole capacity of the secondary battery; an output limit setting module that sets an output limit of the secondary battery as a maximum allowable electric power to be output from the secondary battery based on the state of the secondary battery; a mode setting module that, in a case that the calculated accumulated charge ratio is at least more than or equal to a first preset ratio upon system-on of the hybrid vehicle, sets a motor travel priority mode where the motor travel is prioritized for driving the hybrid vehicle until the calculated accumulated charge ratio becomes less than a second preset ratio that is less than the first preset ratio during vehicle traveling, while setting a hybrid travel priority mode where the hybrid travel is prioritized for driving the hybrid vehicle in a case that the motor travel priority mode is not set; and a control module that, in a case that the motor travel priority mode is set and a preset condition for restricting the motor travel is not satisfied, controls the motor so that the hybrid vehicle is driven with the motor travel on condition that the set driving power is not more than the set output limit of the secondary battery, while controlling the internal combustion engine and the motor so that the hybrid vehicle is driven with the hybrid travel on condition that the set driving power is more than the set output limit of the secondary battery, and in a case that the motor travel priority mode is set and the preset condition is satisfied, the control module controlling the motor so that the hybrid vehicle is driven with the motor travel on condition that the set driving power is not more than a threshold power that is a smaller power between the set output limit of the secondary battery and a predetermined power, while controlling the internal combustion engine and the motor so that the hybrid vehicle is driven with the hybrid travel on condition that the set driving power is more than the threshold power.

In the hybrid vehicle according to this aspect of the invention, the motor travel priority mode is set according to an accumulated charge ratio being at least more than or equal to a first preset ratio upon system-on of the hybrid vehicle until the accumulated charge ratio becomes less than a second preset ratio that is less than the first preset ratio during vehicle traveling, the accumulated charge ratio being a ratio of an accumulated charge amount in the secondary battery to a whole capacity of the secondary battery. In a case that a motor travel priority mode where the motor travel is prioritized for driving the hybrid vehicle is set and a preset condition for restricting the motor travel is not satisfied, the motor is controlled so that the hybrid vehicle is driven with the motor travel on condition that a driving power required for driving the hybrid vehicle is not more than an output limit of the secondary battery as a maximum allowable electric power to be output from the secondary battery, while the internal combustion engine and the motor are controlled so that the hybrid vehicle is driven with the hybrid travel on condition that the driving power is more than the output limit of the secondary battery. In the case that the preset condition for restricting the motor travel is not satisfied, that is, in ordinary cases, the hybrid vehicle is driven with the motor travel when the driving power is not more than the output limit of the secondary battery, and the hybrid vehicle is driven with the hybrid travel when the driving power is more than the output limit of the secondary battery. It is thus enabled that the accumulated charge amount of the secondary battery is lowered fast and the hybrid vehicle is driven with the driving power. On the other hand, in a case that the motor travel priority mode is set and the preset condition is satisfied, the motor is controlled so that the hybrid vehicle is driven with the motor travel on condition that the driving power is not more than a threshold power that is a smaller power between the output limit of the secondary battery and a predetermined power, while the internal combustion engine and the motor are controlled so that the hybrid vehicle is driven with the hybrid travel on condition that the driving power is more than the threshold power. That is to say, in the case that the preset condition for restricting the motor travel is satisfied, the hybrid vehicle is driven with the motor travel when the driving power is not more than the threshold power, and the hybrid vehicle is driven with the hybrid travel when the driving power is more than the threshold power. It is thus enabled that the accumulated charge amount is lowered fast even when the motor travel is restricted, although lowered more slowly than the ordinary cases. Needless to say, it is enabled that the hybrid vehicle is driven with the driving power. As a result, the accumulated charge amount of the secondary battery is effectively lowered by the system-off even when the motor travel is restricted.

In one preferable application of the hybrid vehicle, the preset condition may be a condition that an operation of the internal combustion engine is requested, and the control module, in the case that the motor travel priority mode is set and the preset condition is satisfied on condition that the set driving power is not more than the threshold power, may control the internal combustion engine and the motor so that the hybrid vehicle is driven with the motor travel and the internal combustion engine is in idle operation. This arrangement enables to operate the internal combustion engine even when the hybrid vehicle is driven with the motor travel, and enables to lower the accumulated charge amount of the secondary battery fast. In this case, the preset condition may be a condition that is satisfied when any one of three conditions is satisfied, a condition for operating the internal combustion engine to heat a cabin, a condition for operating the internal combustion engine to heat a catalyst of a catalytic conversion unit attached to an exhaust system of the internal combustion engine, and a condition for operating the internal combustion engine to warm up the internal combustion engine.

In another preferable application of the hybrid vehicle of the invention, the predetermined power may be a power that, when performing the motor travel for a preset distance with, the accumulated charge ratio becomes the second preset ratio from a fully charged state of the secondary battery.

In still another preferable application of the hybrid vehicle of the invention, the control module, in the case that the motor travel priority mode is set and the preset condition is satisfied on condition that the set driving power is more than the threshold power, may control the internal combustion engine and the motor so that the hybrid vehicle is driven with the hybrid travel and the set driving power is output from the internal combustion engine when the set driving power is able to be output from the internal combustion engine, while controlling the internal combustion engine and the motor so that the hybrid vehicle is driven with the hybrid travel and the set driving power is output from the internal combustion engine together with the motor when the set driving power is not able to be output from the internal combustion engine. The hybrid vehicle is driven with the driving power output from the internal combustion engine when the driving power is able to be output from the internal combustion engine, and it is thus enabled to enhance the fuel economy in the hybrid travel. The hybrid vehicle is driven with the driving power output from the internal combustion engine together with the motor when the driving power is not able to be output from the internal combustion engine, and it is thus enabled to cope with the case when the large driving power is needed.

In one preferable application of the hybrid vehicle of the invention, the control module, in the case that the motor travel priority mode is set and the preset condition is satisfied on condition that the set driving power is more than the threshold power, may control the internal combustion engine and the motor so that the hybrid vehicle is driven with the hybrid travel and a power obtained by subtracting the threshold power from the set driving power is output from the internal combustion engine while the threshold power is output from the motor. The threshold power is consumed by the motor even when the hybrid vehicle is driven with the hybrid travel, and it is thus enabled to lower the accumulated charge amount of the secondary battery fast.

In another preferable application of the hybrid vehicle of the invention, the control module, in a case that the hybrid travel priority mode is set and a prohibition condition for prohibiting discharge from the secondary battery is satisfied, may control the internal combustion engine so that the hybrid vehicle is driven only with output power from the internal combustion engine. This arrangement enables to drive the hybrid vehicle without discharge from the secondary battery. In this case, the prohibition condition may be a condition that is satisfied when any one of three conditions is satisfied, a condition for performing forced charge of the secondary battery, a condition that a defroster switch is on for ensuring driver's visibility, and a condition that the set output limit of the secondary battery is not more than a preset limit predetermined as an extremely smaller value than ordinary values.

In one preferable arrangement of the hybrid vehicle of the invention, the hybrid vehicle may further have: a generator constructed to input and output power and transmit electric power to and from the secondary battery; and a planetary gear mechanism with three elements each connected to three shafts, an output shaft of the internal combustion engine, a rotating shaft of the generator, and a driveshaft linked to an axle of the hybrid vehicle, and the control module may control the generator for operation control of the internal combustion engine.

According to another aspect, the present invention is directed to a control method of a hybrid vehicle having an internal combustion engine capable of outputting power for driving the hybrid vehicle, a motor constructed to input and output power for driving the hybrid vehicle, a secondary battery designed to transmit electric power to and from the motor, and a charger connected to an external power supply in a system-off state of the hybrid vehicle to charge the secondary battery with electric power from the external power supply, the hybrid vehicle being capable of motor travel where the hybrid vehicle is driven only with input and output power to and from the motor and hybrid travel where the hybrid vehicle is driven with output power from the internal combustion engine and with the input and output power to and from the motor, the control method including: in a case that a motor travel priority mode where the motor travel is prioritized for driving the hybrid vehicle is set and a preset condition for restricting the motor travel is not satisfied, controlling the motor so that the hybrid vehicle is driven with the motor travel on condition that a driving power required for driving the hybrid vehicle is not more than an output limit of the secondary battery as a maximum allowable electric power to be output from the secondary battery, while controlling the internal combustion engine and the motor so that the hybrid vehicle is driven with the hybrid travel on condition that the driving power is more than the output limit of the secondary battery, and in a case that the motor travel priority mode is set and the preset condition is satisfied, controlling the motor so that the hybrid vehicle is driven with the motor travel on condition that the driving power is not more than a threshold power that is a smaller power between the output limit of the secondary battery and a predetermined power, while controlling the internal combustion engine and the motor so that the hybrid vehicle is driven with the hybrid travel on condition that the driving power is more than the threshold power, wherein the motor travel priority mode is set according to an accumulated charge ratio being at least more than or equal to a first preset ratio upon system-on of the hybrid vehicle until the accumulated charge ratio becomes less than a second preset ratio that is less than the first preset ratio during vehicle traveling, the accumulated charge ratio being a ratio of an accumulated charge amount in the secondary battery to a whole capacity of the secondary battery.

In the control method of the hybrid vehicle according to this aspect of the invention, the motor travel priority mode is set according to an accumulated charge ratio being at least more than or equal to a first preset ratio upon system-on of the hybrid vehicle until the accumulated charge ratio becomes less than a second preset ratio that is less than the first preset ratio during vehicle traveling, the accumulated charge ratio being a ratio of an accumulated charge amount in the secondary battery to a whole capacity of the secondary battery. In a case that a motor travel priority mode where the motor travel is prioritized for driving the hybrid vehicle is set and a preset condition for restricting the motor travel is not satisfied, the motor is controlled so that the hybrid vehicle is driven with the motor travel on condition that a driving power required for driving the hybrid vehicle is not more than an output limit of the secondary battery as a maximum allowable electric power to be output from the secondary battery, while the internal combustion engine and the motor are controlled so that the hybrid vehicle is driven with the hybrid travel on condition that the driving power is more than the output limit of the secondary battery. In the case that the preset condition for restricting the motor travel is not satisfied, that is, in ordinary cases, the hybrid vehicle is driven with the motor travel when the driving power is not more than the output limit of the secondary battery, and the hybrid vehicle is driven with the hybrid travel when the driving power is more than the output limit of the secondary battery. It is thus enabled that the accumulated charge amount of the secondary battery is lowered fast and the hybrid vehicle is driven with the driving power. On the other hand, in a case that the motor travel priority mode is set and the preset condition is satisfied, the motor is controlled so that the hybrid vehicle is driven with the motor travel on condition that the driving power is not more than a threshold power that is a smaller power between the output limit of the secondary battery and a predetermined power, while the internal combustion engine and the motor are controlled so that the hybrid vehicle is driven with the hybrid travel on condition that the driving power is more than the threshold power. That is to say, in the case that the preset condition for restricting the motor travel is satisfied, the hybrid vehicle is driven with the motor travel when the driving power is not more than the threshold power, and the hybrid vehicle is driven with the hybrid travel when the driving power is more than the threshold power. It is thus enabled that the accumulated charge amount is lowered fast even when the motor travel is restricted, although lowered more slowly than the ordinary cases. Needless to say, it is enabled that the hybrid vehicle is driven with the driving power. As a result, the accumulated charge amount of the secondary battery is effectively lowered by the system-off even when the motor travel is restricted. Here in this case, the predetermined power may be a power that, when performing the motor travel for a preset distance with, the accumulated charge ratio becomes the second preset ratio from a fully charged state of the secondary battery.

In one preferable application of the control method of the hybrid vehicle, the preset condition may be a condition that an operation of the internal combustion engine is requested, and the control method, in the case that the motor travel priority mode is set and the preset condition is satisfied on condition that the driving power is not more than the threshold power, may control the internal combustion engine and the motor so that the hybrid vehicle is driven with the motor travel and the internal combustion engine is in an idle operation. This arrangement enables to operate the internal combustion engine even when the hybrid vehicle is driven with the motor travel, and enables to lower the accumulated charge amount of the secondary battery fast. In this case, the preset condition may be a condition that is satisfied when any one of three conditions is satisfied, a condition for operating the internal combustion engine to heat a cabin, a condition for operating the internal combustion engine to heat a catalyst of a catalytic conversion unit attached to an exhaust system of the internal combustion engine, and a condition for operating the internal combustion engine to heat the internal combustion engine.

In another preferable application of the control method of the hybrid vehicle of the invention, the control method, in the case that the motor travel priority mode is set and the preset condition is satisfied on condition that the driving power is more than the threshold power, may control the internal combustion engine and the motor so that the hybrid vehicle is driven with the hybrid travel and the driving power is output from the internal combustion engine when the driving power is able to be output from the internal combustion engine, while controlling the internal combustion engine and the motor so that the hybrid vehicle is driven with the hybrid travel and the driving power is output from the internal combustion engine together with the motor when the driving power is not able to be output from the internal combustion engine. The hybrid vehicle is driven with the driving power output from the internal combustion engine when the driving power is able to be output from the internal combustion engine, and it is thus enabled to enhance the fuel economy in the hybrid travel. The hybrid vehicle is driven with the driving power output from the internal combustion engine together with the motor when the driving power is not able to be output from the internal combustion engine, and it is thus enabled to cope with the case when the large driving power is needed.

In still another preferable application of the control method of the hybrid vehicle of the invention, the control method, in the case that the motor travel priority mode is set and the preset condition is satisfied on condition that the driving power is more than the threshold power, may control the internal combustion engine and the motor so that the hybrid vehicle is driven with the hybrid travel and a power obtained by subtracting the threshold power from the driving power is output from the internal combustion engine while the threshold power is output from the motor. The threshold power is consumed by the motor even when the hybrid vehicle is driven with the hybrid travel, and it is thus enabled to lower the accumulated charge amount of the secondary battery fast.

In one preferable application of the control method of the hybrid vehicle of the invention, the control method, in a case that the hybrid travel priority mode is set and a prohibition condition for prohibiting discharge from the secondary battery is satisfied, may control the internal combustion engine so that the hybrid vehicle is driven only with output power from the internal combustion engine. This arrangement enables to drive the hybrid vehicle without discharge from the secondary battery. In this case, the prohibition condition may be a condition that is satisfied when any one of three conditions is satisfied, a condition for performing forced charge of the secondary battery, a condition that a defroster switch is on for ensuring driver's visibility, and a condition that the output limit of the secondary battery is not more than a preset limit predetermined as an extremely smaller value than ordinary values.

MODES FOR CARRYING OUT THE INVENTION

One mode for carrying out the invention is discussed below as a preferred embodiment.

Figure 1:
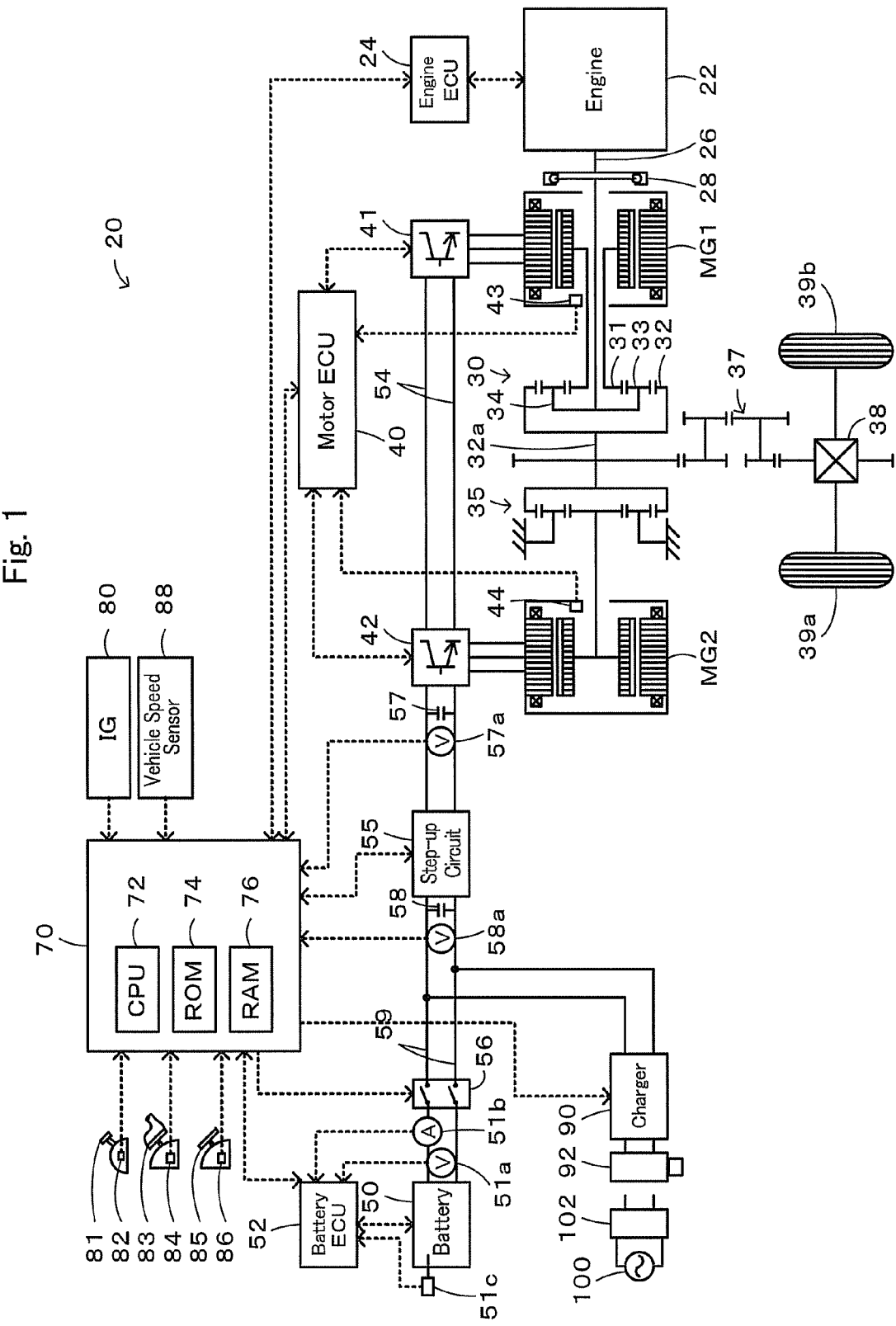
FIG. 1 schematically illustrates the configuration of a hybrid vehicle 20 in one embodiment of the invention.

FIG. 1 schematically illustrates the configuration of a hybrid vehicle 20 in one embodiment according to the invention. As illustrated, the hybrid vehicle 20 of the embodiment includes an engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a motor MG2 connected via a reduction gear 35 to a ring gear shaft 32a or a driveshaft linked with the power distribution integration mechanism 30, inverters 41 and 42 each for driving the motors MG1 and MG2, a battery 50 capable of charge and discharge, a step-up circuit 55 supplying electric power with voltage step-up from the battery 50 to the inverters 41 and 42, a system main relay 56 connecting and disconnecting the battery 50 to and from the step-up circuit 55, a charger 90 converting AC power from an external power supply 100 to DC power to charge the battery 50, and a hybrid electronic control unit 70 configured to control the operations of the whole hybrid vehicle 20.

The engine 22 is constructed as an internal combustion engine designed to consume a hydrocarbon fuel, such as gasoline or light oil, and thereby generate power. The engine 22 is under operation controls, such as fuel injection control, ignition control, and intake air flow control, of an engine electronic control unit (hereafter referred to as engine ECU) 24 that inputs diverse signals from various sensors, for example, a crank position from a non-illustrated crank positions sensor to detect the crank angle of the crankshaft 26, used to measure and detect the operating conditions of the engine 22. The engine ECU 24 establishes communication with the hybrid electronic control unit 70 to drive and control the engine 22 in response to control signals from the hybrid electronic control unit 70 and with reference to the diverse signals from the various sensors and to output data regarding the operating conditions of the engine 22 to the hybrid electronic control unit according to the requirements. The engine ECU 24 also computes a rotation speed of the crankshaft 26, which is equivalent to a rotation speed Ne of the engine 22, based on the crank position from the crank positions sensor.

The power distribution integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 39a and 39b via a gear mechanism 37 and a differential gear 38 from ring gear shaft 32a.

Both the motors MG1 and MG2 are known synchronous motor generators that are driven as a generator and as a motor. The motors MG1 and MG2 transmit electric power to and from the battery 50 via the inverters 41 and 42 and the step-up circuit 55. Power lines (hereafter referred to as high-voltage system power lines) 54 that connect the inverters 41 and 42 with the step-up circuit 55 are constructed as a positive electrode bus line and a negative electrode bus line shared by the inverters 41 and 42. This arrangement enables the electric power generated by one of the motors MG1 and MG2 to be consumed by the other motor. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements. The motor ECU 40 also performs arithmetic operations to compute rotation speeds Nm1 and Nm2 of the motors MG1 and MG2 from the output signals of the rotational position detection sensors 43 and 44.

The step-up circuit 50 is known step-up/down circuit. The step-up circuit 55 is connected to power lines (hereafter referred to as low-voltage system power lines) 59 that are connected via the system main relay 56 to the battery 50, and the above described high-voltage system power line 54. The step-up circuit 55 steps up the voltage of electric power from the battery 50 to supply the electric power to the inverters 41 and 42, and steps down the voltage of electric power applied to the inverters 41 and 42 to charge the battery 50. A smoothing capacitor 57 is connected to the positive electrode bus line and negative electrode bus line of the high-voltage system power lines 54, and a smoothing capacitor 58 is connected to the positive electrode bus line and negative electrode bus line of the low-voltage system power lines 59.

Figure 2:
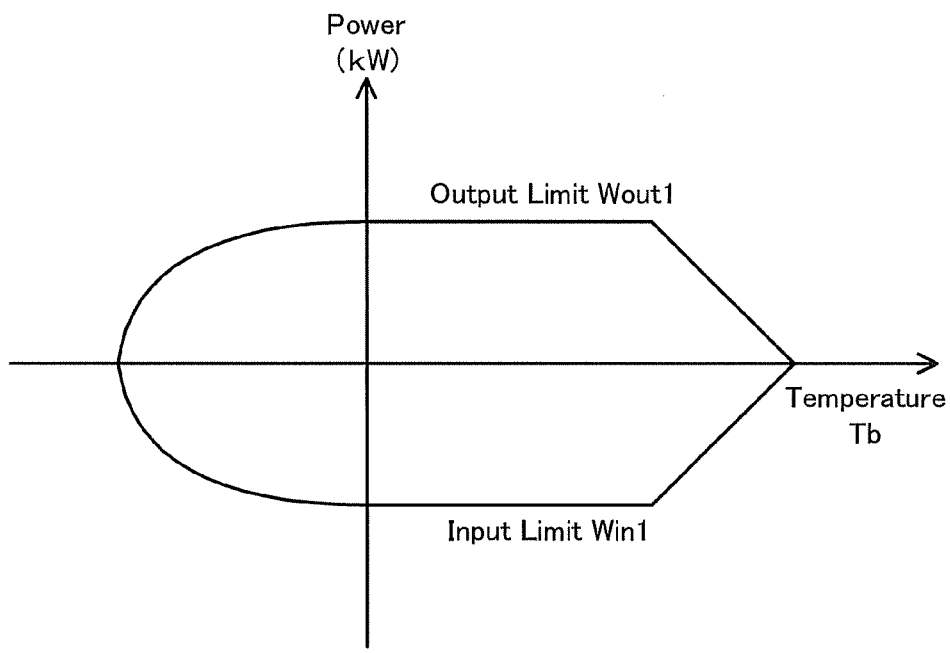
FIG. 2 shows variations of an input limit Win and an output limit Wout against a battery temperature Tb of a battery 50.
Figure 3:
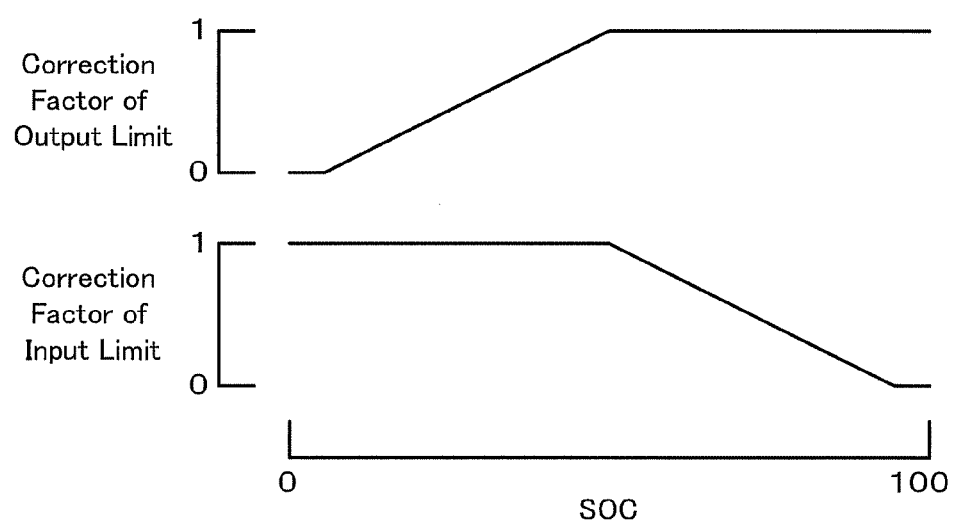
FIG. 3 shows variations of respective correction factors of the input limit Win and the output limit Wout against accumulated charge ratio SOC of the battery 50.

The battery 50 is constructed as a lithium-ion secondary battery under control of a battery electronic control unit (hereafter referred to as battery ECU) 52. The battery ECU 52 receives diverse signals required for control of the battery 50, for example, an inter-terminal voltage Vb measured by a voltage sensor 51a disposed between terminals of the battery 50, a charge-discharge current Ib measured by a current sensor 51b attached to an output terminal at the positive pole side of the battery 50, and a battery temperature Tb measured by a temperature sensor 51c attached to the battery 50. The battery ECU 52 outputs data relating to the state of the battery 50 to the hybrid electronic control unit 70 via communication according to the requirements. The battery ECU 52 performs various arithmetic operations for management and control of the battery 50. An accumulated charge ratio SOC of the battery 50 as a ratio of an accumulated charge amount dischargeable from the battery 50 to the total capacity of the battery 50 is calculated from an integrated value of the charge-discharge current Ib measured by the current sensor 51b. An input limit Win as an allowable charging electric power to be charged in the battery 50 and an output limit Wout as an allowable discharging electric power to be discharged from the battery 50 are set corresponding to the calculated accumulated charge ratio SOC and the battery temperature Tb. A concrete procedure of setting the input and output limits Win and Wout of the battery 50 sets base values of the input limit Win and the output limit Wout corresponding to the battery temperature Tb, specifies an input limit correction factor and an output limit correction factor corresponding to the accumulated charge amount SOC of the battery 50, and multiplies the base values of the input limit Win and the output limit Wout by the specified input limit correction factor and output limit correction factor to determine the input limit Win and the output limit Wout of the battery 50. FIG. 2 shows variations of the input limit Win and the output limit Wout against battery temperature Tb of the battery 50. FIG. 3 shows variations of correction factors of the input limit Win and the output limit Wout against accumulated charge ratio SOC1 of the battery 50.

The charger 90 is attached to the low-voltage system power lines 59, and designed to charge the battery 50 with electric power from the external power supply 100 by connecting a vehicle side connector 92 to an external power supply side connector 102 of the external power supply 100. The charger includes a charging relay that makes connection and disconnection between the low-voltage system power lines 59 and the vehicle side connector 92, an AC-to-DC converter that converts AC power from the external power supply 100 to DC power, and a DC-to-DC converter that regulates the voltage of the DC power converted by the AC-to-DC converter to supply the power to the side of the low-voltage system power lines 59 although non-illustrated.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: a voltage (voltage of the high-voltage system) VH measured by a voltage sensor 57a disposed between terminals of the condenser 57, a voltage (voltage of the low-voltage system) VL measured by a voltage sensor 58a disposed between terminals of the condenser 58, an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 outputs various signals via the output port: switching control signals to switching elements of the step-up circuit 55, driving signals to the system main relay 56, control signals to the charger 90. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of the accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a. Both of the torque conversion drive mode and the charge-discharge drive mode are modes for controlling the engine 22 and the motors MG1 and MG2 to output the required level of power to the ring gear shaft 32a with operation of the engine 22, and a combination of the both modes is thus considered as an engine drive mode hereafter.

Figure 4:
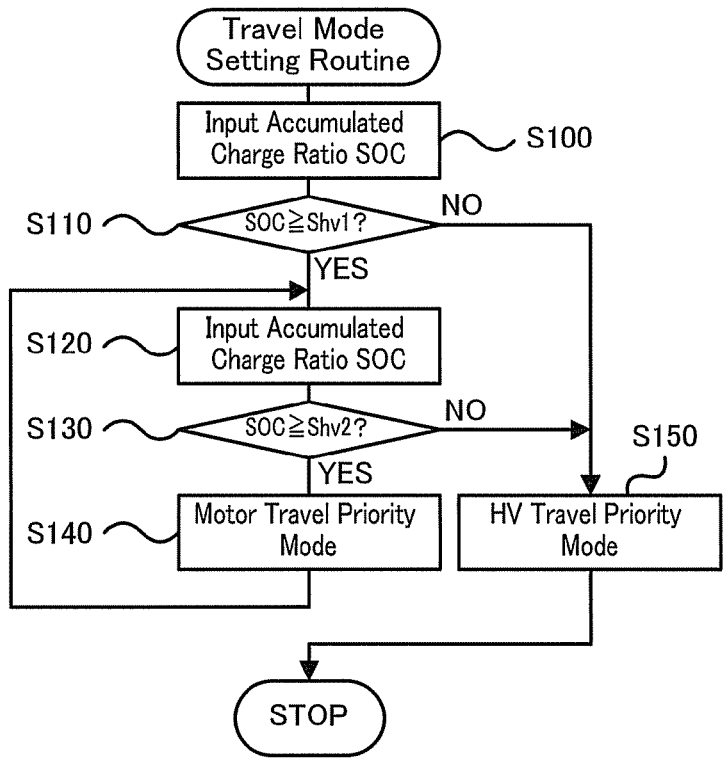
FIG. 4 is a flowchart showing a travel mode setting routine executed by a hybrid electronic control unit 70 in the embodiment.

In the hybrid vehicle 20 of the embodiment, charge-discharge control of the battery 50 is performed during vehicle traveling to lower the accumulated charge ratio SOC of the battery 50 to the enough extent allowing startup of the engine 22 when arriving at home or at a predetermined charging point. Upon connection of the vehicle side connector 92 of the charger 90 with the external power supply side connector 102 of the external power supply 100 after system shutdown of the vehicle at home or at the predetermined charging point, the battery 50 is brought to the fully charged state or a preset charge state that is less charged state than the fully charged state by controlling the non-illustrated DC-to-DC converter and AC-to-DC converter in the charger 90. When system startup is performed after charging the battery 50, the hybrid vehicle 20 is driven according to a flowchart showing a travel mode setting routine of FIG. 4. When the accumulated charge ratio SOC of the battery 50 at the system startup is not less than a threshold value Sev (for example, 40% or 50%) that is predetermined as an accumulated charge ratio SOC allowing some extent of motor travel, the hybrid vehicle is driven in the setting of a motor travel priority mode where vehicle traveling with the motor drive mode (motor travel) is prioritized, until the accumulated charge ratio SOC of the battery 50 becomes less than a threshold value Shv (for example, 20% or 30%) that is predetermined to enable starting up the engine 22 adequately (step S100 through S140). When the accumulated charge ratio SOC of the battery 50 at the system startup is less than the threshold value Sev or after the accumulated charge ratio SOC of the battery 50 reaches the threshold value Shv following the case that the accumulated charge ratio SOC of the battery 50 at the system startup is not less than the threshold value Sev, the hybrid vehicle 20 is driven in the setting of a hybrid travel priority mode where vehicle traveling with the engine drive mode (hybrid travel) is prioritized (step S150).

Figure 5:
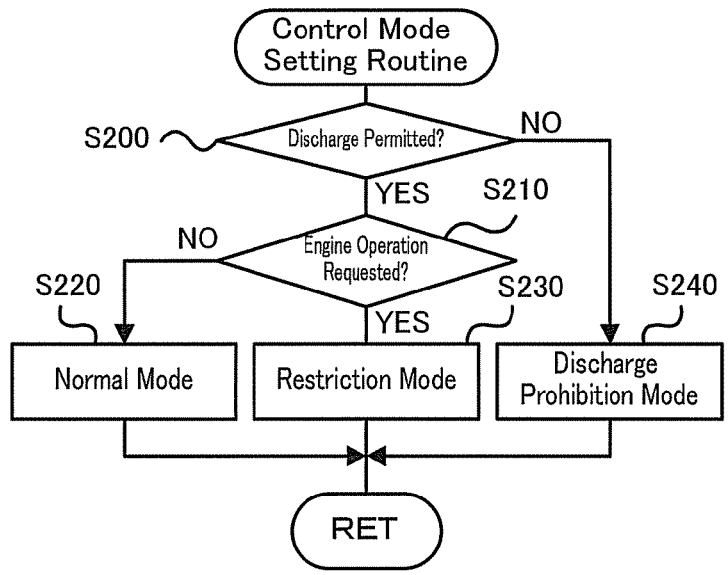
FIG. 5 is a flowchart showing a control mode setting routine executed by the hybrid electronic control unit 70 in the embodiment when a motor travel priority mode is set.

In the hybrid vehicle 20 of the embodiment, upon setting the motor travel priority mode, one control mode in the motor travel priority mode is set according to a control mode setting routine of FIG. 5. It is determined whether discharge of the battery 50 is permitted or not and whether operation of the engine 22 is requested or not (step S200 and S210). When discharge of the battery 50 is permitted and operation of the engine 22 is not requested, a normal mode is set (step S220). In the normal mode, the motor travel is prioritized for driving the hybrid vehicle 20 in operation stop of the engine 22. When discharge of the battery 50 is permitted but operation of the engine 22 is requested, it is decided that the motor travel is restricted and a restriction mode is set (step S230). In the restriction mode, the motor travel is prioritized to some extent for driving the hybrid vehicle 20 in operation of the engine 22. When discharge of the battery 50 is prohibited, a discharge prohibition mode is set (step S240). In the discharge prohibition mode, the hybrid vehicle 20 is driven with the hybrid travel while charging the battery 50. There are some cases where discharge of the battery 50 is prohibited, for example, a case where the accumulated charge ratio SOC of the battery 50 is small and it becomes necessary to discharge the battery 50, a case where the output limit Wout of the battery 50 is extremely smaller than ordinary values, and a case where a defroster switch is on for ensuring the driver's visibility. There are some cases where operation of the engine 22 is requested, for example, a case where operation of the engine 22 is requested to heat a cabin of the hybrid vehicle 20, a case where operation of the engine 22 is requested to heat a catalyst of a non-illustrated catalytic conversion unit attached to an exhaust system of the engine 22, and a case where operation of the engine 22 is requested to warm up the engine 22.

Figure 6:
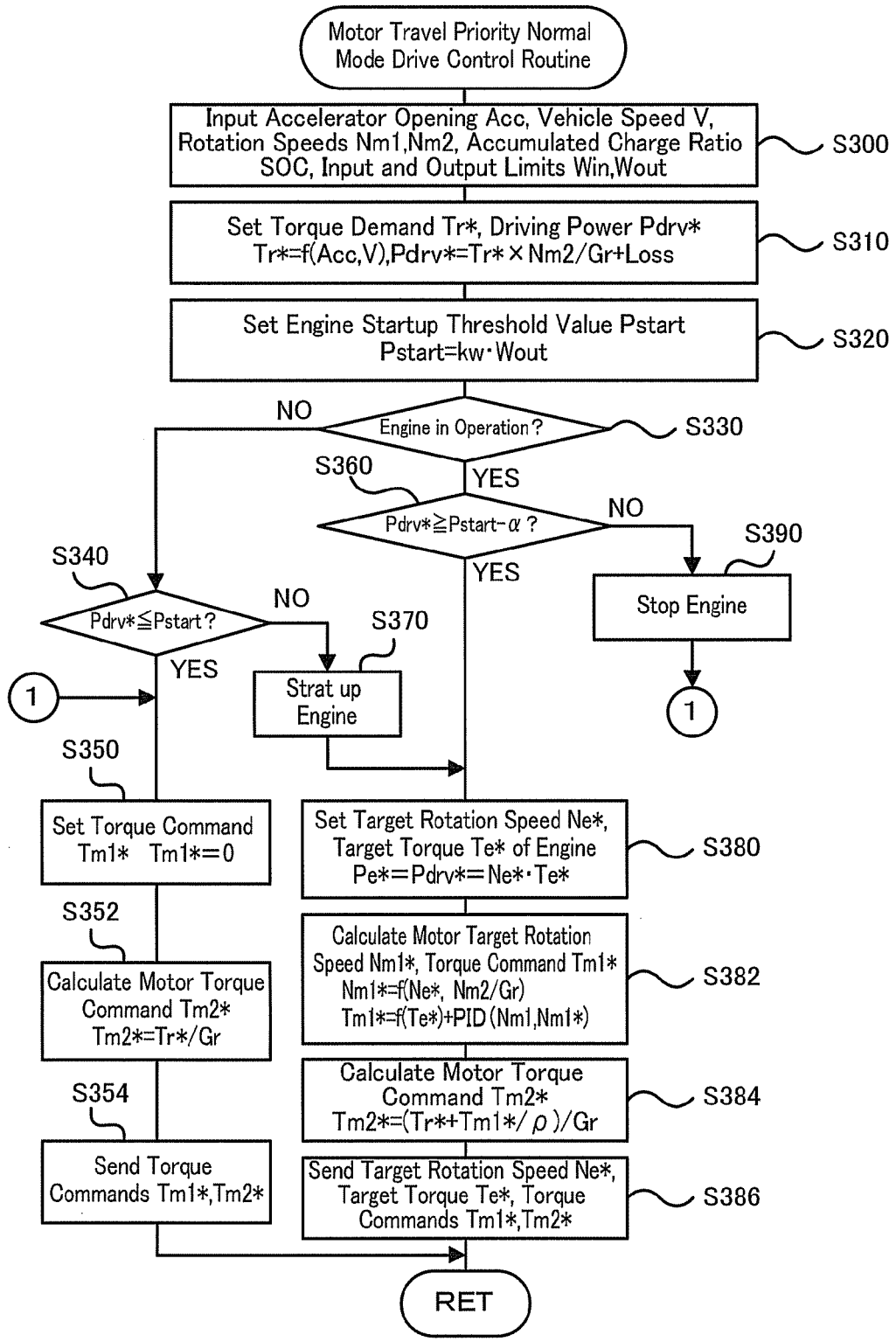
FIG. 6 is a flowchart showing a motor travel priority normal mode drive control routine executed by the hybrid electronic control unit 70 in the embodiment.
Figure 7:
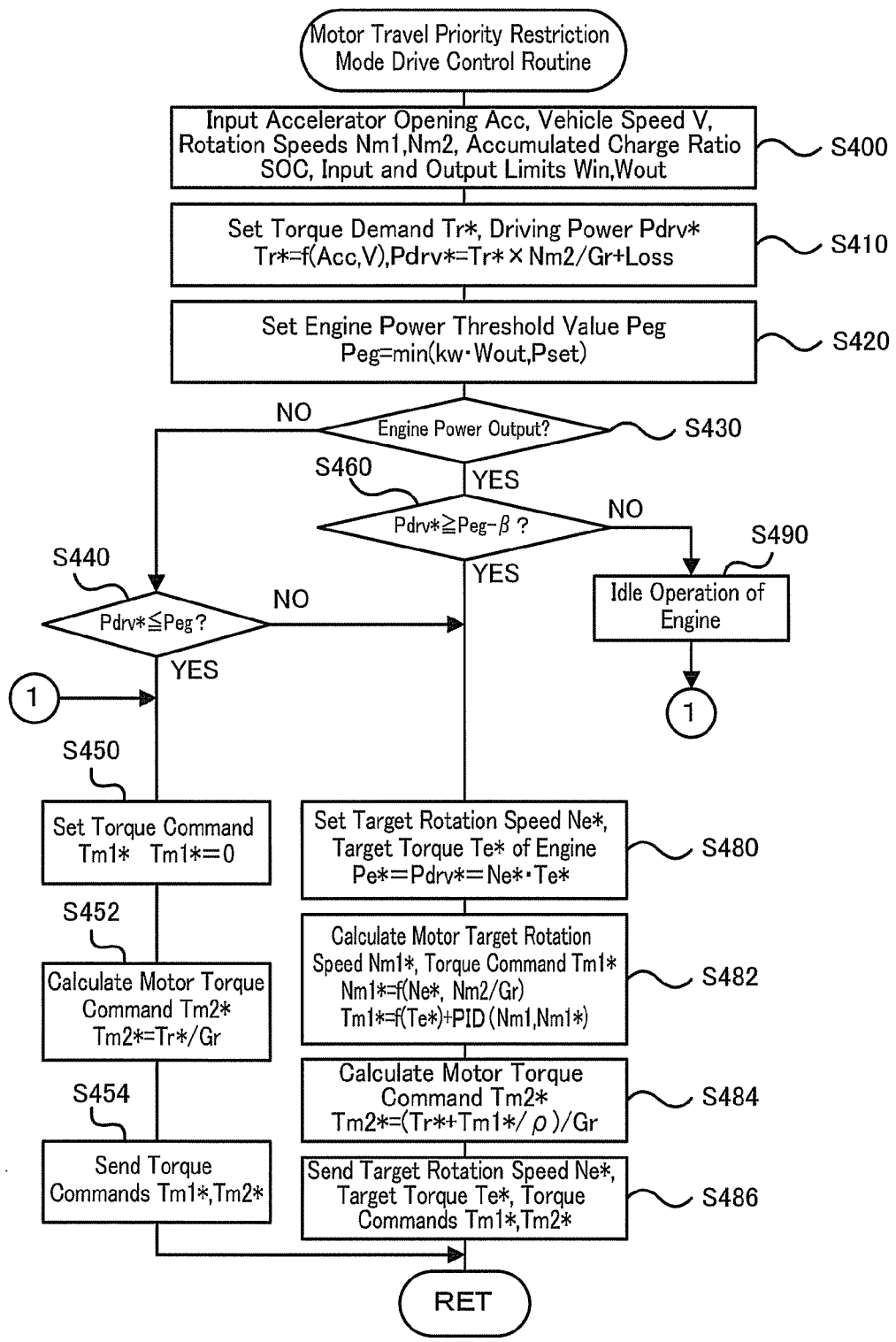
FIG. 7 is a flowchart showing a motor travel priority restriction mode drive control routine executed by the hybrid electronic control unit 70 in the embodiment.
Figure 8:
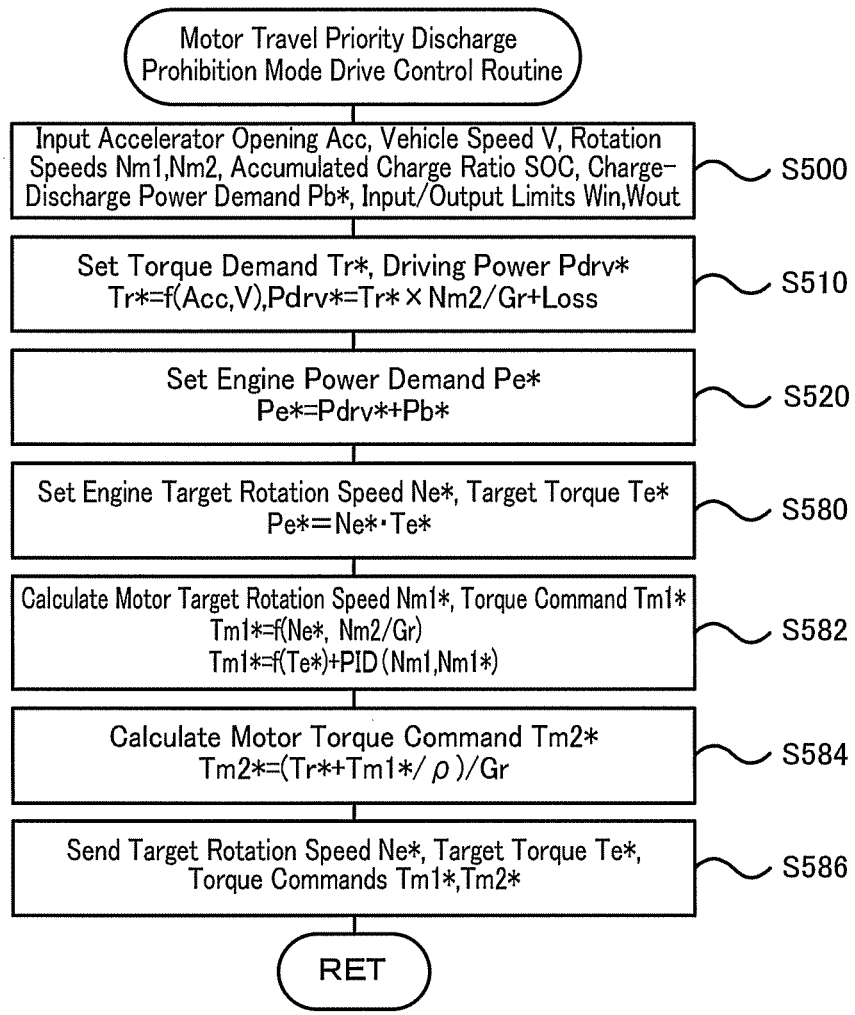
FIG. 8 is a flowchart showing a motor travel priority discharge prohibition mode drive control routine executed by the hybrid electronic control unit 70 in the embodiment.
Figure 9:
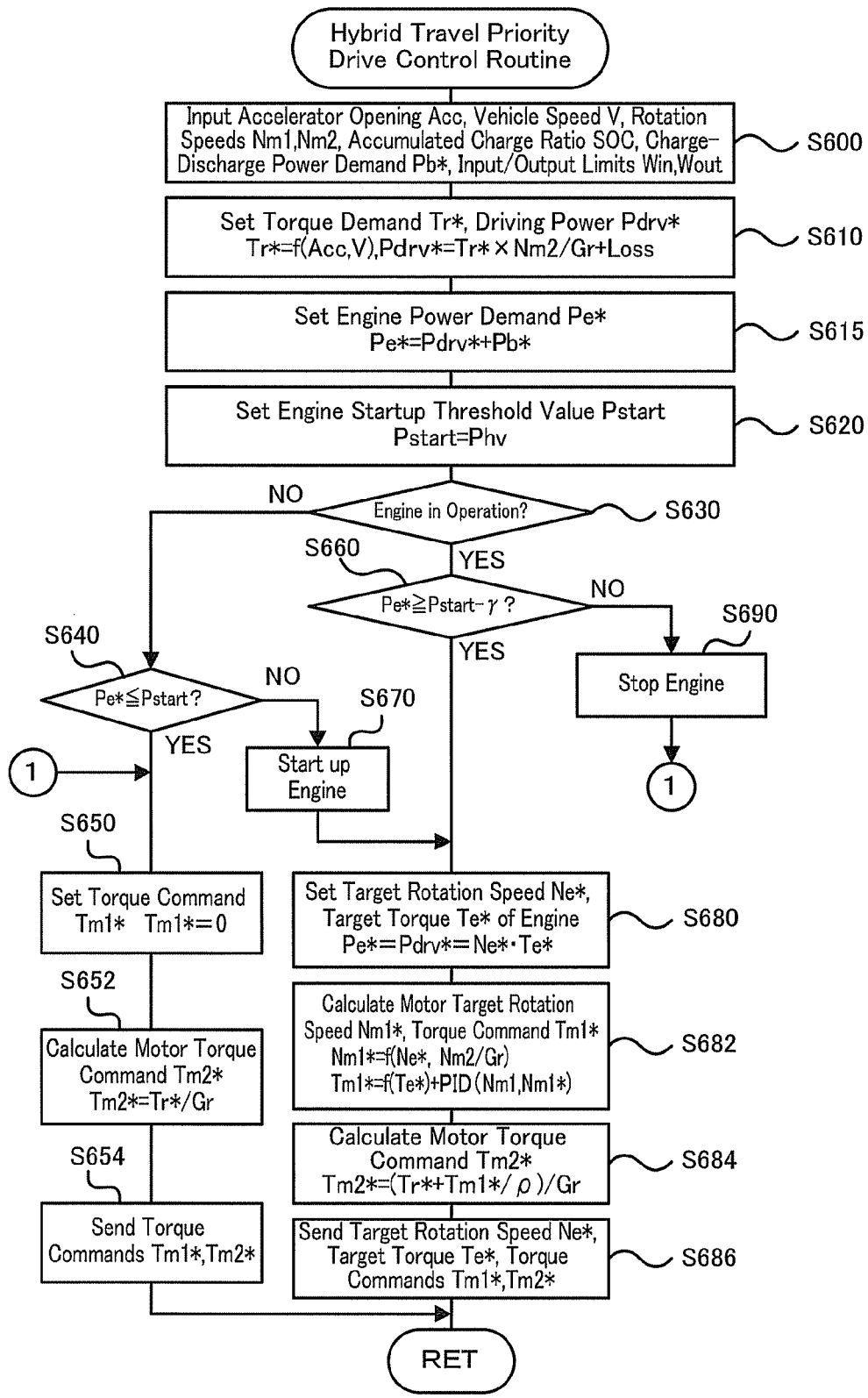
FIG. 9 is a flowchart showing a hybrid travel priority drive control routine executed by the hybrid electronic control unit 70 in the embodiment.

The description regards the operations of the hybrid vehicle 20 of the embodiment having the configuration discussed above. FIG. 6 is a flowchart showing a motor travel priority normal mode drive control routine executed by the hybrid electronic control unit 70 when the normal mode is set as the control mode in the state that the motor travel priority mode is set. FIG. 7 is a flowchart showing a motor travel priority restriction mode drive control routine executed by the hybrid electronic control unit 70 when the restriction mode is set as the control mode in the state that the motor travel priority mode is set. FIG. 8 is a flowchart showing a motor travel priority discharge prohibition mode drive control routine executed by the hybrid electronic control unit 70 when the discharge prohibition mode is set as the control mode in the state that the motor travel priority mode is set. FIG. 9 is a flowchart showing a hybrid travel priority drive control routine executed by the hybrid electronic control unit 70 when the hybrid travel priority mode is set. Each control is described below in turn.

The motor travel priority normal mode drive control routine of FIG. 6 is executed when the normal mode is set as the control mode in the state that the motor travel priority mode is set. In this routine, the CPU 72 of the hybrid electronic control unit 70 inputs various data required for drive control, for example, the accelerator opening Acc from the accelerator pedal position sensor 84, the vehicle speed V from the vehicle speed sensor 88, the rotation speeds Nm1 and Nm2 of the motors MG1 and MG2, the accumulated charge ratio SOC of the battery 50, and the input and output limits Win and Wout of the battery 50 (step S300). The rotation speeds Nm1 and Nm2 of the motors MG1 and MG2 are computed from the output signals of the rotational position detection sensors 43 and 44 and input from the motor ECU 40 by communication. The accumulated charge ratio SOC of the battery 50 is calculated from the integrated value of the charge-discharge current Ib measured by the current sensor 51b and input from the battery ECU 52 by communication. The input limit Win and the output limit Wout of the battery 50 is set based on the battery temperature Tb of the battery 50 and the accumulated charge ratio SOC of the battery 50 and input from the battery ECU 52 by communication.

Figure 10:
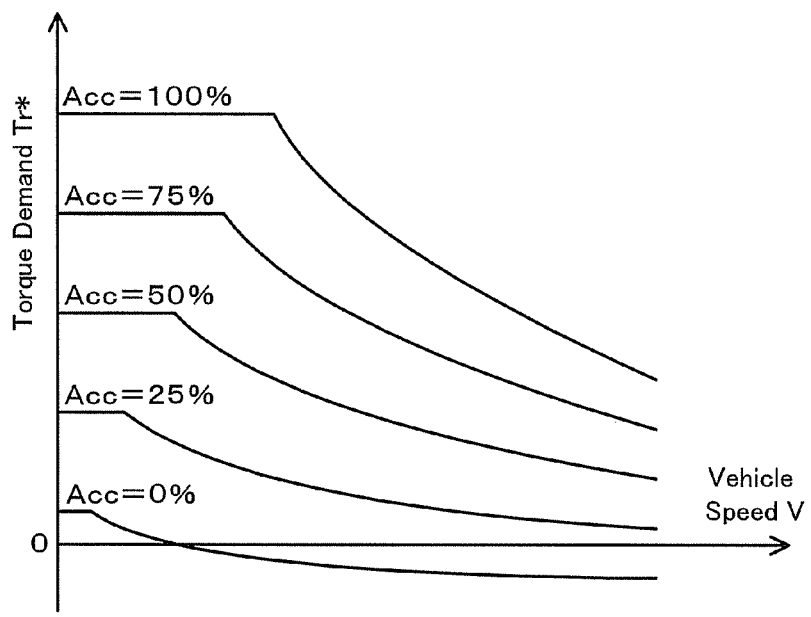
FIG. 10 shows one example of a torque demand setting map.

After the data input, the CPU 72 sets a torque demand Tr* to be output to the ring gear shaft 32a or the driveshaft linked with the drive wheels 39a and 39b as a torque required for the hybrid vehicle 20 based on the input accelerator opening Acc and the input vehicle speed V, and sets a driving power Pdrv* required for driving the hybrid vehicle 20 (step S310). The CPU 72 obtains a value from multiplying the output limit Wout by a preset conversion factor kw for converting electric power to power for a driving system of the hybrid vehicle 20 and sets the obtained value as a threshold value Pstart for starting up the engine 22 (step S320). A concrete procedure of setting the torque demand Tr* in this embodiment provides and stores in advance variations in torque demand Tr* against the vehicle speed V with regard to various settings of the accelerator opening Acc as a torque demand setting map in the ROM 74 and reads the torque demand Tr* corresponding to the given accelerator opening Acc and the given vehicle speed V from this torque demand setting map. One example of the torque demand setting map is shown in FIG. 10. The driving power Pdrv* is calculated as the sum of the product of the set torque demand Tr* and a rotation speed Nr of the ring gear shaft 32a, and a potential loss Loss. The rotation speed Nr of the ring gear shaft 32a is obtained by multiplying the vehicle speed V by a preset conversion factor k (Nr=k·V) or by dividing the rotation speed Nm2 of the motor MG2 by a gear ratio Gr of the reduction gear 35 (Nr=Nm2/Gr).

Figure 11:
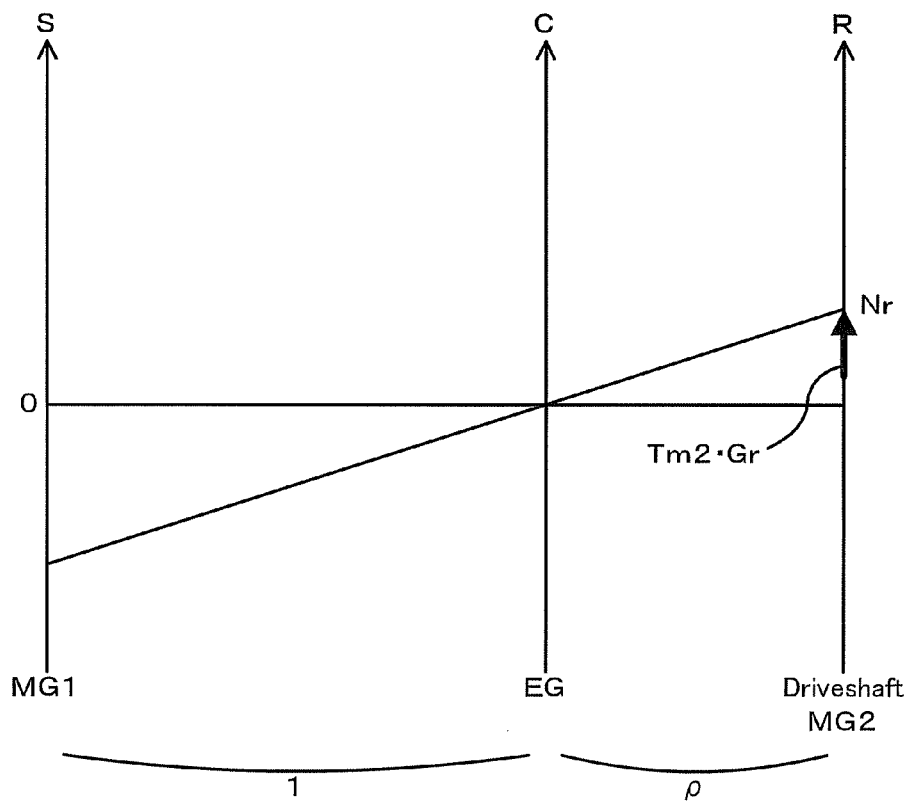
FIG. 11 is an alignment chart showing torque-rotation speed dynamics of respective rotational elements included in a power distribution integration mechanism 30 while performing motor travel in operation stop of an engine 22.

The CPU 72 subsequently determines whether the engine 22 is operated or the operation of the engine 22 is stopped (step S330). When the operation of the engine 22 is stopped, the CPU 72 determines whether the set driving power Pdrv* is less than or equal to the threshold value Pstart (step S340). When the driving power Pdrv* is less than or equal to the threshold value Pstart, it is decided that the motor travel should be continued and the CPU 72 sets a torque command Tm1* of the motor MG1 to value '0' (step S350). The CPU 72 sets a torque command Tm2* of the motor MG2 by dividing the torque demand Tr* by the gear ratio Gr of the reduction gear 35 (step S352), and sends the settings of the torque commands Tm1* and Tm2* to the motor ECU 40 (step S354). This routine is then terminated. This control enables the torque demand Tr* to be output from the motor MG2 to the ring gear shaft 32a or the drive shaft for driving the hybrid vehicle 20. FIG. 11 is an alignment chart showing torque-rotation speed dynamics of respective rotational elements included in the power distribution integration mechanism 30 during the motor travel with operation stop of an engine 22. The left axis 'S' represents a rotation speed of the sun gear 31 that is equivalent to the rotation speed Nm1 of the motor MG1. The middle axis 'C' represents a rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by the gear ratio Gr of the reduction gear 35.

Upon determination that the driving power Pdrv* is more than the threshold value Pstart at the processing of step S340, the CPU 72 starts up the engine 22 (step S370). In a procedure for starting up the engine 22, the motor MG1 outputs some torque, the motor MG2 outputs torque for canceling the torque output to the ring gear shaft 32a or the driveshaft according to the output torque from the motor MG1 to crank the engine 22, and various controls are started such as fuel injection control and ignition control when the rotation speed Ne of the engine 22 reaches a preset rotation speed (for example, 1000 rpm). During start-up of the engine 22, the drive control of the motor MG2 is performed as well to output the torque demand Tr* to the ring gear shaft 32a. The torque to be output from the motor MG2 thus becomes the sum of the torque to output the torque demand Tr* to the ring gear shaft 32a and the torque to cancel the applied torque to the ring gear shaft 32a by cranking the engine 22.

Figure 12:
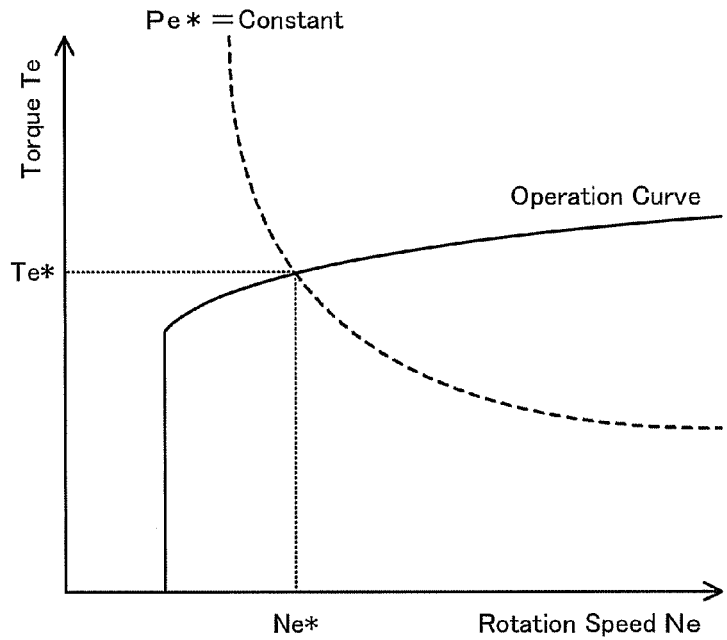
FIG. 12 shows an operation curve of the engine 22 used to set the target rotation speed Ne* and the target torque Te*.

After starting up the engine 22, the CPU 72 sets the driving power Pdrv* to a power demand Pe* to be output from the engine 22 and sets a target rotation speed Ne* and a target torque Te* defining a target drive point of the engine 22 based on an operation curve of the engine 22 to ensure efficient operation of the engine 22 and the power demand Pe* (step S380). FIG. 12 shows an operation curve of the engine 22 used to set the target rotation speed Ne* and the target torque Te*. As clearly shown in the figure, the target rotation speed Ne* and the target torque Te* are given as an intersection of the operation curve and a curve of constant power demand Pe* (=Ne*×Te*).

Figure 13:
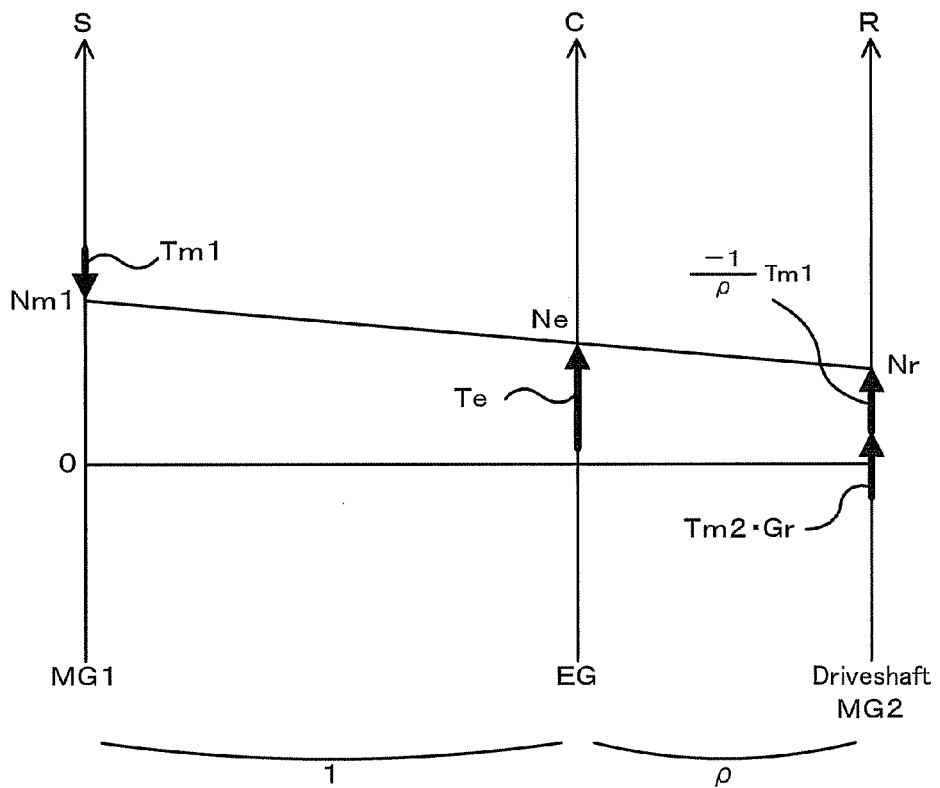
FIG. 13 is an alignment chart showing torque-rotation speed dynamics of the respective rotational elements included in the power distribution integration mechanism 30 during vehicle traveling with output power from the engine 22.

The CPU 72 calculates a target rotation speed Nm1* of the motor MG1 from the target rotation speed Ne* of the engine 22, the rotation speed Nm2 of the motor MG2, and a gear ratio ρ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S382). Equation (1) is a dynamic relational expression of respective rotational elements included in the power distribution integration mechanism 30. FIG. 13 is an alignment chart showing torque-rotation speed dynamics of the respective rotational elements included in the power distribution integration mechanism 30 during vehicle traveling with output power from the engine 22. Two thick arrows on the axis 'R' respectively show a torque applied to the ring gear shaft 32a by output of the torque Tm1 from the motor MG1, and a torque applied to the ring gear shaft 32a via the reduction gear 35 by output of the torque Tm2 from the motor MG2. Equation (1) is readily introduced from this alignment chart. Equation (2) is a relational expression of feedback control to drive and rotate the motor MG1 at the target rotation speed Nm1*. In Equation (2), 'k1' in the second term and 'k2' in the third term on the right side respectively denote a gain of the proportional and a gain of the integral term.

$$Nm1^* = Ne^* \cdot (1+\rho)/\rho - Nm2/\rho \qquad (1)$$

$$Tm1^* = \rho \cdot Te^*/(1+\rho) + k1(Nm1^* - Nm1) + k2 \int (Nm1^* - Nm1) dt \qquad (2)$$

The CPU 72 then calculates a torque command Tm2* of the motor MG2 by adding the torque command Tm1* of the motor MG1 divided by the gear ratio ρ of the power distribution integration mechanism 30 to the torque demand Tr* according to Equation (3) given below (step S384). The CPU 72 sends the settings of the target rotation speed Ne* and the target torque Te* of the engine 22 to the engine ECU 24 and the settings of the torque commands Tm1* and Tm2* of the motors MG1 and MG2 to the motor ECU 40 (step S386), and this routine is terminated. In response to reception of the settings of the target rotation speed Ne* and the target torque Te*, the engine ECU 24 performs required controls including intake air flow regulation, ignition control, and fuel injection control of the engine 22 to drive the engine 22 at the specific drive point defined by the combination of the target rotation speed Ne* and the target torque Te*. In response to reception of the settings of the torque commands Tm1* and Tm2*, the motor ECU 40 performs switching control of the switching elements in the inverter 41 and the switching elements in the inverter 42 to drive the motor MG1 with the torque commands Tm1* and the motor MG2 with the torque command Tm2*. This control enables the driving power Pdrv* to be output efficiently from the engine 22 to output the torque demand Tr* to the ring gear shaft 32a or the driveshaft for driving the hybrid vehicle 20. Equation (3) is readily introduced from the alignment chart of FIG. 13.

$$Tm2^* = (Tr^* + Tm1^*/\rho)/Gr \qquad (3)$$

After driving start of the hybrid vehicle 20 with power from the engine 22, it is determined that the engine 22 is operated at the processing of step S330 when this routine is executed next time, and the CPU 72 compares the driving power Pdrv* with a value obtained by subtracting a preset power α as a margin from the threshold value Pstart (step S360). The preset power α is for having hysteresis to avoid frequent start and stop of the engine 22 while the driving power Pdrv* is near the threshold value Pstart and is predetermined to the extent appropriate. When the driving power Pdrv* is more than the value obtained by subtracting the preset power a from the threshold value Pstart, it is decided that the operation of the engine 22 should be continued. The CPU 72 sets the target rotation speed Ne* and the target rotation torque Te* of the engine 22 and the torque commands Tm1* and Tm2* of the motors MG1 and MG2 to output the torque demand Tr* to the ring gear shaft 32a or the driveshaft for driving the hybrid vehicle 20 while outputting the driving power Pdrv* efficiently from the engine 22, and sends the settings to the engine ECU 24 and the motor ECU 40 (step S380 through S386). This routine is then terminated. When the driving power Pdrv* is less than the value obtained by subtracting the preset power α from the threshold value Pstart, the operation of the engine 22 is stopped (step S390). The CPU 72 sets the torque command Tm1* of the motor MG1 to value '0' to perform the motor travel and sets the torque command Tm2* to the torque demand Tr* divided by the gear ratio Gr of the reduction gear 35 and sends the settings of the torque commands Tm1* and Tm2* to the motor ECU 40 (steps S350 through S354). This routine is then terminated.

The motor travel priority restriction mode drive control routine of FIG. 7 is executed when the restriction mode is set as the control mode in the state that the motor travel priority mode is set. In the restriction mode, this routine is executed after the engine 22 is started up. In this routine, the CPU 72 of the hybrid electronic control unit 70 inputs various data required for drive control, for example, the accelerator opening Acc from the accelerator pedal position sensor 84, the vehicle speed V from the vehicle speed sensor 88, the rotation speeds Nm1 and Nm2 of the motors MG1 and MG2, the accumulated charge ratio SOC of the battery 50, and the input and output limits Win and Wout of the battery 50 (step S400). The CPU 72 sets a torque demand Tr* to be output to the ring gear shaft 32a or the driveshaft based on the accelerator opening Acc and the vehicle speed V using the torque demand setting map of FIG. 10 and sets a driving power Pdrv* as the sum of the product of the set torque demand Tr* and the rotation speed Nr of the ring gear shaft 32a and a potential loss Loss (step S410). The CPU 72 sets a smaller value to a threshold value Peg for driving the hybrid vehicle 20 with power from the engine 22 between an obtained value (kw·Wout) from multiplying the output limit Wout of the battery 50 by a preset conversion factor kw for converting electric power to power for a driving system of the hybrid vehicle 20 and a preset power Pset that is smaller than the output limit Wout of the battery 50 at a normal time (step S420). The preset power Pset is a predetermined power to enhance efficiency more when the hybrid vehicle 20 is driven with power from the engine 22 than with the motor travel in idle operation of the engine 22, and to bring the accumulated charge ratio SOC of the battery 50 to the extent of the threshold value Shv above described when the motor travel is started from the fully charged state of the battery 50 and performed for a predetermined distance (for example, 15 km or 20 km). As the preset power Pset, for example, a value equivalent to 50% or 60% of the output limit Wout of the battery 50 at the normal time may be used. This arrangement that the threshold value Peg for driving the hybrid vehicle 20 with power from the engine 22 is smaller than the threshold value Pstart above described in the normal mode means to restrict the motor travel. The preset power Pset may be predetermined to the extent appropriate according the capacity of the battery 50 and the characteristics of the hybrid vehicle 20.

The CPU 72 subsequently determines whether the hybrid vehicle 20 is driven with output power from the engine 22 or the engine 22 is in idle operation (step S430). When the engine 22 is in idle operation, the CPU 72 determines whether the set driving power Pdrv* is less than or equal to the threshold value Peg (step S440). When the driving power Pdrv* is less than or equal to the threshold value Peg, it is decided that the motor travel should be continued with the state that the engine 22 is in idle operation and the CPU 72 sets a torque command Tm1* of the motor MG1 to value '0' (step S450).

Figure 14:
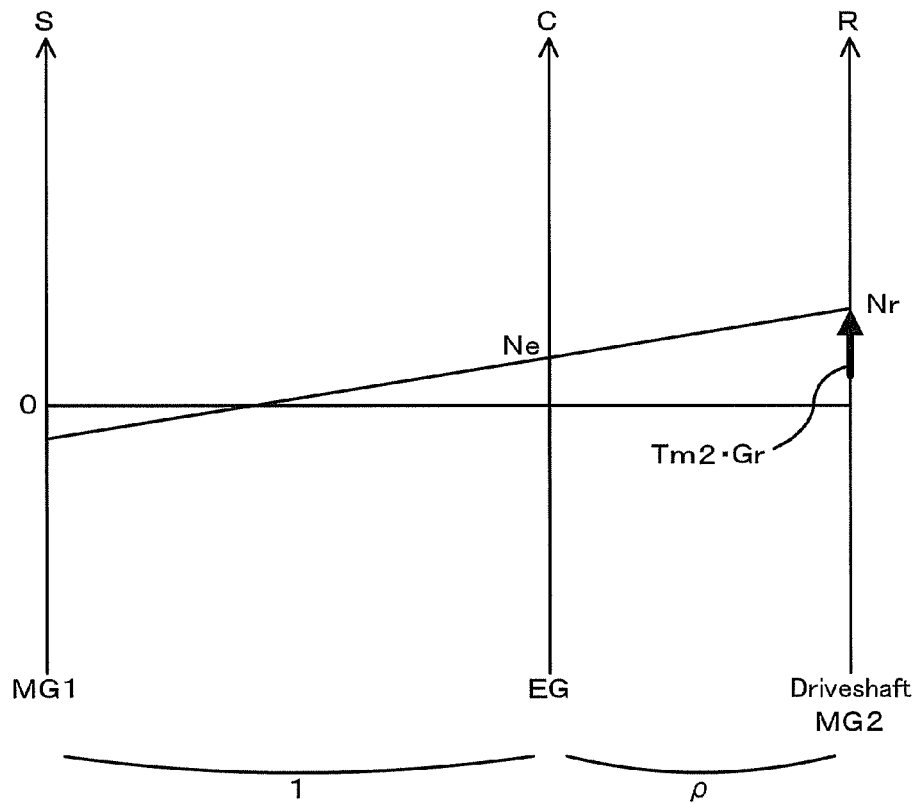
FIG. 14 is an alignment chart showing torque-rotation speed dynamics of the respective rotational elements included in the power distribution integration mechanism 30 while performing the motor travel in idle operation of the engine 22.

The CPU 72 sets a torque command Tm2* of the motor MG2 by dividing the torque demand Tr* by the gear ratio Gr of the reduction gear 35 (step S452), and sends the settings of the torque commands Tm1* and Tm2* to the motor ECU 40 (step S454). This routine is then terminated. This control enables the torque demand Tr* to be output from the motor MG2 to the ring gear shaft 32a or the drive shaft for driving the hybrid vehicle 20 in the state that the engine 22 is in idle operation. FIG. 14 is an alignment chart showing torque-rotation speed dynamics of respective rotational elements included in the power distribution integration mechanism 30 while performing the motor travel in idle operation of the engine 22.

Upon determination that the driving power Pdrv* is more than the threshold value Peg at the processing of step S440, the CPU 72 sets the driving power Pdrv* to a power demand Pe* to be output from the engine 22 and sets a target rotation speed Ne* and a target torque Te* based on the operation curve of the engine 22 to ensure efficient operation of the engine 22 (see FIG. 12) and the power demand Pe* (step S480). The CPU 72 calculates the target rotation speed Nm1* of the motor MG1 according to Equation (1) given above, while calculating the torque command Tm1* of the motor MG1 according to Equation (2) (step 482). The CPU 72 calculates the torque command Tm2* of the motor MG2 according to Equation (3) (step S484), and sends the settings of the target rotation speed Ne* and the target torque Te* of the engine 22 to the engine ECU 24 and the settings of the torque commands Tm1* and Tm2* of the motors MG1 and MG2 to the motor ECU 40 (step S486). This routine is then terminated. This control enables the driving power Pdrv* to be output efficiently from the engine 22 to output the torque demand Tr* to the ring gear shaft 32a or the driveshaft for driving the hybrid vehicle 20.

After driving start of the hybrid vehicle 20 with power from the engine 22, it is determined that the hybrid vehicle 20 is driven with output power from the engine 22 at the processing of step S430 when this routine is executed next time, and the CPU 72 compares the driving power Pdrv* with a value obtained by subtracting a preset power β as a margin from the threshold value Peg (step S460). The preset power β is for having hysteresis to avoid frequent change between vehicle traveling with output power from the engine 22 and the motor travel with the idle operation of the engine 22 while the driving power Pdrv* is near the threshold value Peg. The preset power β may be the same value as the preset power α above described or a different value from the preset power α. When the driving power Pdrv* is more than the value obtained by subtracting the preset power β from the threshold value Peg, it is decided that the vehicle traveling with output power from the engine 22 should be continued. The CPU 72 sets the target rotation speed Ne* and the target rotation torque Te* of the engine 22 and the torque commands Tm1* and Tm2* of the motors MG1 and MG2 to output the torque demand Tr* to the ring gear shaft 32a or the driveshaft for driving the hybrid vehicle 20 while outputting the driving power Pdrv* efficiently from the engine 22, and sends the settings to the engine ECU 24 and the motor ECU 40 (step S480 through S486). This routine is then terminated. When the driving power Pdrv* is less than the value obtained by subtracting the preset power β from the threshold value Peg, the engine 22 is operated in the state of idle operation (step S490). The CPU 72 sets the torque command Tm1* of the motor MG1 to value '0' to perform the motor travel with the state that the engine 22 is in idle operation and sets the torque command Tm2* to the torque demand Tr* divided by the gear ratio Gr of the reduction gear 35 and sends the settings of the torque commands Tm1* and Tm2* to the motor ECU 40 (steps S450 through S454). This routine is then terminated.

Figure 15:
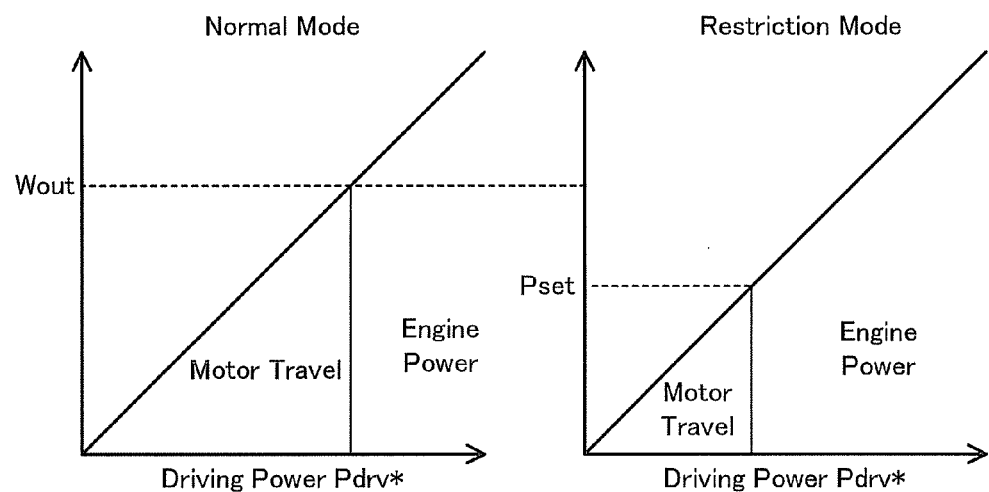
FIG. 15 shows one example of relations in the setting of an normal mode and the setting of a restriction mode, each relation between a driving power Pdrv* and whether motor travel is performed or vehicle traveling with power from the engine 22 is performed.

FIG. 15 shows one example of relations in the setting of the normal mode and the setting of the restriction mode, each relation between the driving power Pdrv* and whether the motor travel is performed or the vehicle traveling with power from the engine 22 is performed. As illustrated, the hybrid vehicle 20 is driven with the motor travel until the driving power Pdrv* reaches the output limit Wout of the battery 50 in the normal mode, while the hybrid vehicle 20 is driven with the motor travel that is limited within the range of the threshold value Pset in the restriction mode. In addition, the engine 22 is in operation stop when the motor travel is performed in the normal mode, while the engine 22 is in idle operation when the motor travel is performed in the restriction mode.

The motor travel priority discharge prohibition mode drive control routine of FIG. 8 is executed when the discharge prohibition mode is set as the control mode in the state that the motor travel priority mode is set. In the discharge prohibition mode, this routine is executed after the engine 22 is started up. In this routine, the CPU 72 of the hybrid electronic control unit 70 inputs various data required for drive control, for example, the accelerator opening Acc from the accelerator pedal position sensor 84, the vehicle speed V from the vehicle speed sensor 88, the rotation speeds Nm1 and Nm2 of the motors MG1 and MG2, the accumulated charge ratio SOC of the battery 50, the input and output limits Win and Wout of the battery 50, and a charge-discharge power demand Pb* (step S500). The CPU 72 sets a torque demand Tr* to be output to the ring gear shaft 32a or the driveshaft based on the accelerator opening Acc and the vehicle speed V and sets a driving power Pdrv* as the sum of the product of the set torque demand Tr* and the rotation speed Nr of the ring gear shaft 32a and a potential loss Loss (step S510). The charge-discharge power demand Pb* may be a predetermined value as a power for charging when the accumulated charge ratio SOC of the battery 50 is small and a forced charge of the battery 50 becomes necessary, or a value according to the accumulated charge ration SOC. In the embodiment, a value is predetermined to enable a relatively fast charge of the battery 50 and used as the charge-discharge power demand Pb*.

The CPU 72 sets a power demand Pe* to be output from the engine 22 as the sum of the driving power Pdrv* and the charge-discharge power demand Pb* (step S520), and sets a target rotation speed Ne* and a target torque Te* based on the operation curve of the engine 22 to ensure efficient operation of the engine 22 (see FIG. 12) and the power demand Pe* (step S580). The CPU 72 calculates the target rotation speed Nm1* of the motor MG1 according to Equation (1) given above, while calculating the torque command Tm1* of the motor MG1 according to Equation (2) (step 582). The CPU 72 calculates the torque command Tm2* of the motor MG2 according to Equation (3) (step S584), and sends the settings of the target rotation speed Ne* and the target torque Te* of the engine 22 to the engine ECU 24 and the settings of the torque commands Tm1* and Tm2* of the motors MG1 and MG2 to the motor ECU 40 (step S586). This routine is then terminated. This control enables the driving power Pdrv* and the charge-discharge power demand Pb* for charging the battery 50 to be output efficiently from the engine 22 to output the torque demand Tr* to the ring gear shaft 32a or the driveshaft for driving the hybrid vehicle 20.

Figure 16:
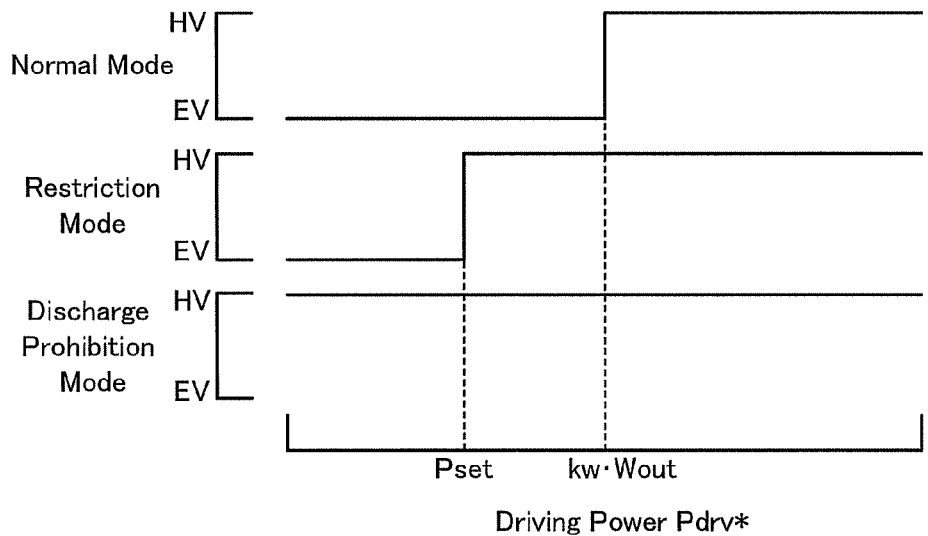
FIG. 16 shows one example of relations in the setting of the normal mode, the setting of the restriction mode, and the setting of the discharge prohibition mode, each relation between the driving power Pdrv* and whether the motor travel (EV) is performed or the vehicle traveling with power from the engine 22 (HV) is performed.

FIG. 16 shows one example of relations in the setting of the normal mode, the setting of the restriction mode, and the setting of the discharge prohibition mode, each relation between the driving power Pdrv* and whether the motor travel (EV) is performed or the vehicle traveling with power from the engine 22 (HV) is performed. As illustrated, the range of the vehicle traveling with power from the engine 22 (HV) becomes narrower in the order of the normal mode, the restriction mode, the discharge prohibition mode.

Figure 17:
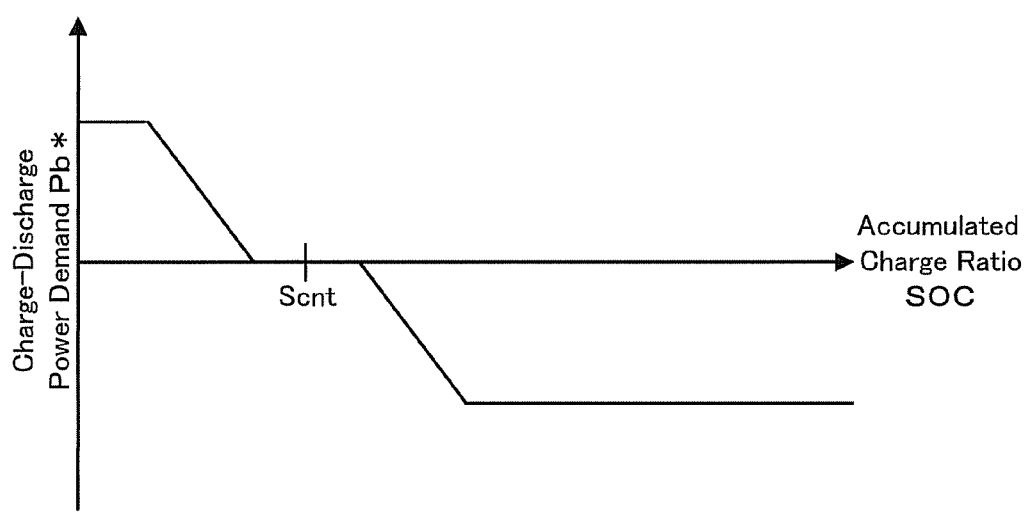
FIG. 17 shows one example of a charge-discharge power demand setting map.

The hybrid travel priority drive control routine of FIG. 9 is executed when the hybrid travel priority mode is set. In this routine, the CPU 72 of the hybrid electronic control unit 70 inputs various data required for drive control, the accelerator opening Acc from the accelerator pedal position sensor 84, the vehicle speed V from the vehicle speed sensor 88, the rotation speeds Nm1 and Nm2 of the motors MG1 and MG2, the accumulated charge ratio SOC of the battery 50, the input and output limits Win and Wout of the battery 50, and a charge-discharge power demand Pb* (step S600). The CPU 72 sets a torque demand Tr* to be output to the ring gear shaft 32a or the driveshaft based on the accelerator opening Acc and the vehicle speed V using the torque demand setting map of FIG. 10 and sets the driving power Pdrv* as the sum of the product of the torque demand Tr* and the rotation speed Nr of the ring gear shaft 32a and the potential loss Loss (step S610). A concrete procedure of setting the charge-discharge power demand Pb* in this embodiment provides and stores in advance variations in charge-discharge power demand Pb* against the accumulated charge ratio SOC of the battery 50 as a charge-discharge power demand setting map and reads the charge-discharge power demand Pb* corresponding to the given accumulated charge ratio SOC of the battery 50 from this charge-discharge power demand setting map. One example of the charge-discharge power demand setting map is shown in FIG. 17. In this embodiment as shown in the figure, a small dead band is prepared with a control center accumulated charge ratio Scnt as the center, and a charge-discharge power demand Pb* to discharge the battery 50 is set against a larger accumulated charge ratio SOC than ratios in the dead band, while a charge-discharge power demand Pb* to charge the battery 50 is set against a smaller accumulated charge ratio SOC than ratios in the dead band. The control center accumulated charge ratio Scnt may be set arbitrarily to a value more than or equal to the threshold value Shv for setting the travel mode.

The CPU 72 subsequently sets the power demand Pe* to be output from the engine 22 as the sum of the driving power Pdrv* and the charge-discharge power demand Pb* (step S615), and sets a preset power Phv, which is predetermined as a little larger power than the minimum power enabling efficient operation of the engine 22, into the threshold value Pstart for starting up the engine 22 (step S620).

The CPU 72 determines whether the engine 22 is operated or the operation of the engine 22 is stopped (step S630). When the operation of the engine 22 is stopped, the CPU 72 determines whether the power demand Pe* is less than or equal to the threshold value Pstart (step S640). When the power demand Pe* is less than or equal to the threshold value Pstart, it is decided that the motor travel should be performed and the CPU 72 sets the torque command Tm1* of the motor MG1 to value '0' (step S650), while setting the torque command Tm2* of the motor MG2 by dividing the torque demand Tr* by the gear ratio Gr of the reduction gear 35 (step S652). The CPU 72 then sends the settings of the torque commands Tm1* and Tm2* to the motor ECU 40 (step S654), and this routine is terminated. This control enables the torque demand Tr* to be output from the motor MG2 to the ring gear shaft 32a or the drive shaft for driving the hybrid vehicle 20.

Upon determination that the power demand Pe* is more than the threshold value Pstart at the processing of step S640, the CPU 72 starts up the engine 22 (step S670), and the CPU 72 sets the target rotation speed Ne* and the target torque Te* of the engine 22 based on the operation curve (see FIG. 12) of the engine 22 to ensure efficient operation of the engine 22 and the power demand Pe* (step S680). The CPU 72 calculates the target rotation speed Nm1* of the motor MG1 according to Equation (1) given above, while calculating the torque command Tm1* of the motor MG1 according to Equation (2) (step 682). The CPU 72 calculates the torque command Tm2* of the motor MG2 according to Equation (3) (step S684), and sends the settings of the target rotation speed Ne* and the target torque Te* of the engine 22 to the engine ECU 24 and the settings of the torque commands Tm1* and Tm2* of the motors MG1 and MG2 to the motor ECU 40 (step S686). This routine is then terminated. This control enables the driving power Pdrv* and the charge-discharge power demand Pb* for charge and discharge of the battery 50 to be output efficiently from the engine 22 to output the torque demand Tr* to the ring gear shaft 32a or the driveshaft for driving the hybrid vehicle 20.

After driving start of the hybrid vehicle 20 with power from the engine 22, it is determined that the engine 22 is operated at the processing of step S630 when this routine is executed next time, and the CPU 72 compares the driving power Pdrv* with a value obtained by subtracting a preset power γ as a margin from the threshold value Pstart (step S660). The preset power γ is, as with the preset power α described above, for having hysteresis to avoid frequent start and stop of the engine 22 while the driving power Pdrv* is near the threshold value Pstart. The preset power γ may be the same value as the preset power α or the preset power β, or a different value from the preset power α or the preset power β. When the driving power Pdrv* is more than the value obtained by subtracting the preset power γ from the threshold value Pstart, it is decided that travelling with power from the engine 22 should be continued. The CPU 72 sets the target rotation speed Ne* and the target rotation torque Te* of the engine 22 and the torque commands Tm1* and Tm2* of the motors MG1 and MG2 to output the torque demand Tr* to the ring gear shaft 32a or the driveshaft for driving the hybrid vehicle 20 while outputting the driving power Pdrv* and the charge-discharge power demand Pb* efficiently from the engine 22, and sends the settings to the engine ECU 24 and the motor ECU 40 (step S680 through S686). This routine is then terminated. When the driving power Pdrv* is less than the value obtained by subtracting the preset power γ from the threshold value Pstart, the operation of the engine 22 is stopped (step S690). The CPU 72 sets the torque command Tm1* of the motor MG1 to value '0' to perform the motor travel and sets the torque command Tm2* to the torque demand Tr* divided by the gear ratio Gr of the reduction gear 35 and sends the settings of the torque commands Tm1* and Tm2* to the motor ECU 40 (steps S650 through S654). This routine is then terminated.

In the hybrid vehicle 20 of the embodiment described above, when discharge of the battery 50 is permitted and operation of the engine 22 is requested in the case where the motor travel priority mode is set as the travel mode, the restriction mode is set as the control mode. In the restriction mode, the driving power Pdrv* is compared with the threshold value Peg as the smaller value between the value obtained from multiplying the output limit Wout of the battery 50 by the conversion factor kw (kw·Wout) and the preset power Pset. The preset power Pset is set to enhance efficiency more when the hybrid vehicle 20 is driven with power from the engine 22 than with the motor travel in idle operation of the engine 22, and to bring the accumulated charge ratio SOC of the battery 50 to the extent of the threshold value Shv when the motor travel is started from the fully charged state of the battery 50 and performed for the predetermined distance. The hybrid vehicle 20 is driven with the motor travel in idle operation of the engine 22 when the driving power Pdrv* is less than or equal to the threshold value Peg, and the hybrid vehicle 20 is driven with power from the engine 22 when the driving power Pdrv* is more than the threshold value Peg. It is accordingly enabled to lower the accumulated charge ratio SOC of the battery 50 fast even when operation of the engine 22 is requested, that is, when the motor travel is restricted. As a result, the accumulated charge ratio SOC of the battery 50 is effectively lowered by the system-off even when the motor travel is restricted. When discharge of the battery 50 is permitted and operation of the engine 22 is not requested in the case where the motor travel priority mode is set as the travel mode, the normal mode is set as the control mode. In the normal mode, the driving power Pdrv* is compared with the threshold value Pstart as an obtained value from multiplying the output limit Wout of the battery 50 by the conversion factor kw (kw·Wout). The hybrid vehicle 20 is driven with the motor travel in operation stop of the engine 22 when the driving power Pdrv* is less than or equal to the threshold value Pstart, and the hybrid vehicle 20 is driven with power from the engine 22 when the driving power Pdrv* is more than the threshold value Pstart. Needless to say, the accumulated charge ratio SOC of the battery 50 is lowered fast. It is thus enabled that the accumulated charge ratio SOC of the battery 50 is lowered by the system-off.

In the hybrid vehicle 20 of the embodiment described above, when discharge of the battery 50 is prohibited in the case where the motor travel priority mode is set as the travel mode, the discharge prohibition mode is set as the control mode. In the discharge prohibition mode, the hybrid vehicle 20 is driven with power from the engine 22 while the battery 50 is charged regardless of the driving power Pdrv*. It is accordingly enabled that the hybrid vehicle 20 is driven without discharging the battery 50 in some cases, for example, a case where the accumulated charge ratio SOC of the battery 50 is small and it becomes necessary to discharge the battery 50, a case where the output limit Wout of the battery 50 is extremely smaller than ordinary values, and a case where the defroster switch is on for ensuring the driver's visibility. In the case where the hybrid travel priority mode is set as the travel mode, the power demand Pe* as the sum of the driving power Pdrv* and the charge-discharge power demand Pb* is compared with the threshold value Pstart as the preset power Phv that is predetermined to be a little larger power than the minimum power enabling efficient operation of the engine 22. The hybrid vehicle 20 is driven with the motor travel in operation stop of the engine 22 when the power demand Pe* is less than or equal to the threshold value Pstart, and the hybrid vehicle 20 is driven with power from the engine 22 when the power demand Pe* is more than the threshold value Pstart. Needless to say, the hybrid vehicle 20 is driven efficiently.

Figure 18:
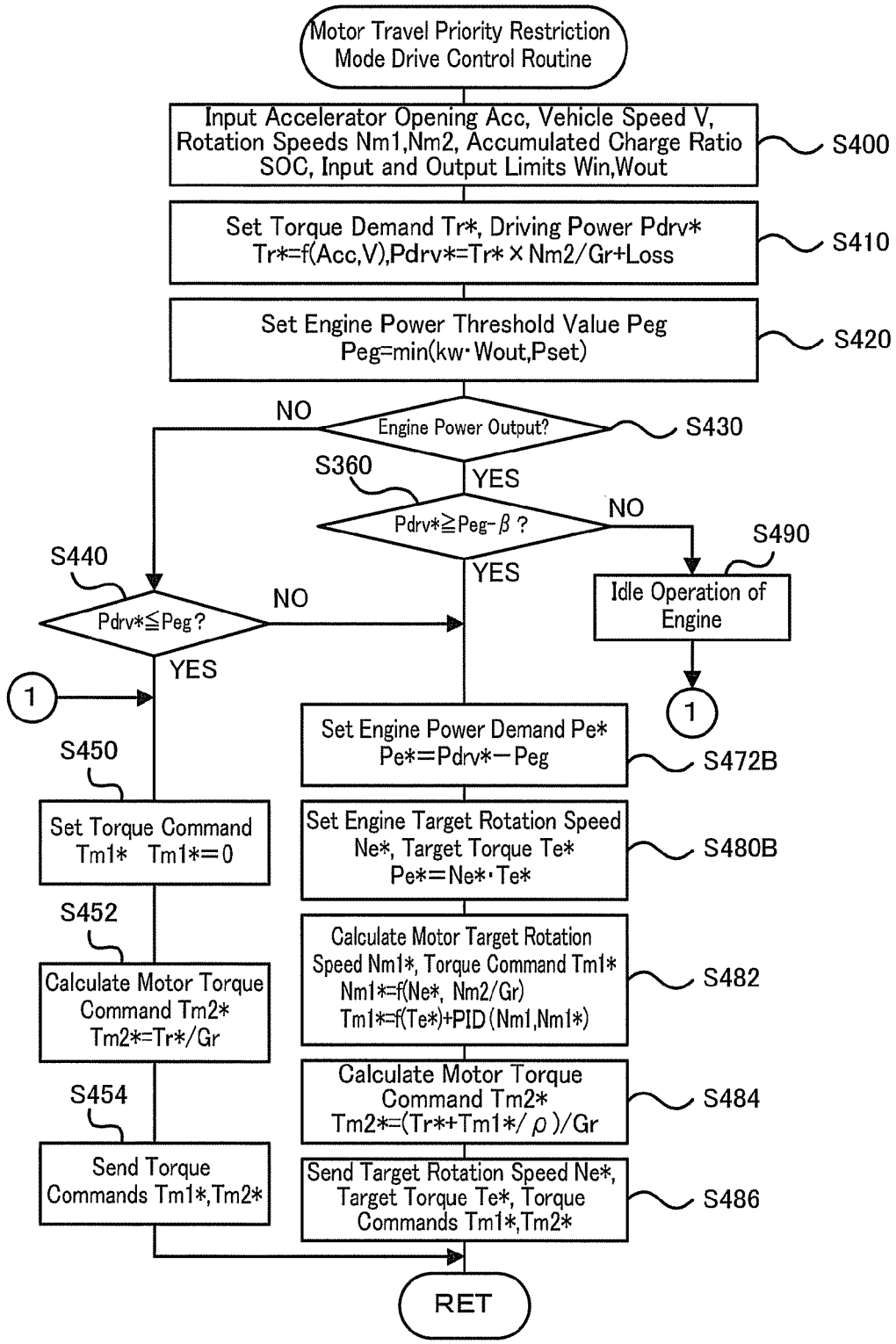
FIG. 18 is a flowchart showing a motor travel priority restriction mode drive control routine in one modified example.
Figure 19:
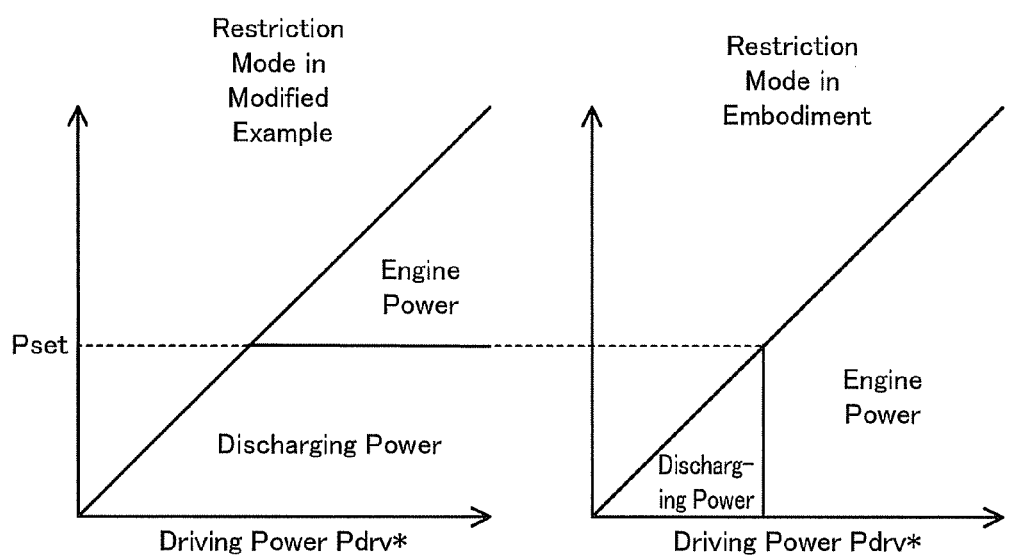
FIG. 19 shows one example of relations in the setting of the restriction mode of one modified example and the setting of the restriction mode of the embodiment, each relation among the driving power Pdrv*, a discharging power of the battery 50, and an output power from the engine 22.

In the hybrid vehicle 20 of the embodiment, when the restriction mode is set in the case that discharge of the battery 50 is permitted but operation of the engine 22 is requested in the setting of the motor travel priority mode as the travel mode, the driving power Pdrv* is compared with the threshold value Peg as the smaller value between the value obtained from multiplying the output limit Wout of the battery 50 by the conversion factor kw (kw·Wout) and the preset power Pset. The hybrid vehicle 20 is driven with the motor travel in idle operation of the engine 22 when the driving power Pdrv* is less than or equal to the threshold value Peg, and the hybrid vehicle 20 is driven with power from the engine 22 when the driving power Pdrv* is more than the threshold value Peg. This is not essential. The hybrid vehicle 20 may be driven with the motor travel in operation stop of the engine 22 when the driving power Pdrv* is less than or equal to the threshold value Peg, while driving the hybrid vehicle 20 with outputting a power which is obtained by subtracting the threshold value Peg from the driving power Pdrv* from the engine 22 and with covering a corresponding power to the threshold value Peg by discharge of the battery 50. FIG. 18 shows a motor travel priority restriction mode drive control routine in this case. In this routine, subsequent to determination that the driving power Pdrv* is more than the threshold value Peg, when the hybrid vehicle 20 shifts its state from vehicle traveling with the motor travel in idle operation of the engine 22 to vehicle traveling with power from the engine 22 or when the hybrid vehicle 20 is continuously driven with power from the engine 22, the CPU 72 sets a power demand Pe* by subtracting the threshold value Peg from the driving power Pdrv* (step S472B), and the CPU 72 sets a target rotation speed Ne* and a target torque Te* based on the operation curve of the engine 22 to ensure efficient operation of the engine 22 (see FIG. 12) and the set power demand Pe* (step S480B). The CPU 72 calculates the target rotation speed Nm1* of the motor MG1 according to Equation (1) given above, while calculating the torque command Tm1* of the motor MG1 according to Equation (2) (step 482). The CPU 72 calculates the torque command Tm2* of the motor MG2 according to Equation (3) (step S484), and sends the settings of the target rotation speed Ne* and the target torque Te* of the engine 22 to the engine ECU 24 and the settings of the torque commands Tm1* and Tm2* of the motors MG1 and MG2 to the motor ECU 40 (step S486). This routine is then terminated. This control enables a power corresponding to the threshold value Peg to be discharged from the battery 50 and a power obtained from subtracting the threshold value Peg from the driving power Pdrv* to be output efficiently from the engine 22 to output the torque demand Tr* to the ring gear shaft 32a or the driveshaft for driving the hybrid vehicle 20. FIG. 19 shows one example of relations in the setting of the restriction mode of this modified example and the setting of the restriction mode of the embodiment, each relation among the driving power Pdrv*, a discharging power of the battery 50, and an output power from the engine 22. In the setting of the restriction mode of the embodiment, the hybrid vehicle 20 is driven with the driving power Pdrv* output from the engine 22 without discharging the battery 50 when the driving power Pdrv* exceeds the preset power Pset. In the setting of the restriction mode of the modified example, the corresponding power to the preset power Pset is discharged from the battery 50 and the obtained power by subtracting the preset power Pset from the driving power Pdrv* is output from the engine 22 to drive the hybrid vehicle 20, when the driving power Pdrv* exceeds the preset power Pset. In the hybrid vehicle 20 of this modified example, the corresponding power to the threshold value Peg is discharged from the battery 50 even when the hybrid vehicle 20 is driven using power from the engine 22, it is accordingly enabled that the accumulated charge ratio SOC of the battery 50 is lowered fast.

In the hybrid vehicle 20 of the embodiment, discharge of the battery 50 is prohibited and the discharge prohibition mode is set as the control mode in the case where the motor travel priority mode is set as the travel mode, the power demand Pe* of the engine 22 is set as the sum of the charge-discharge power demand Pb* for discharging the battery 50 and the driving power Pdrv*, and the hybrid vehicle 20 is driven with power from the engine 22 while the battery 50 is charged. This is not essential. Depending on the reason for prohibiting discharge of the battery 50, for example, the case where the output limit Wout of the battery 50 is extremely smaller than ordinary values and discharge of the battery 50 is prohibited, and the case where the defroster switch is on for ensuring the driver's visibility, the battery 50 may not be charged.

In the hybrid vehicle 20 of the embodiment, the single battery 50 is installed. Instead, two or more batteries may be installed, and the batteries may be charged in the system-off state and the hybrid vehicle may be driven with the motor travel priority mode in sequential connection of the batteries. In this case, the accumulated charge ratio SOC may be calculated as a ratio of the accumulated charge amounts in the batteries to the total capacity of the batteries.

In the hybrid vehicle 20 of the embodiment, when the hybrid vehicle 20 is driven with power from the engine 22 in the setting of the normal mode or the restriction mode as the control mode in the case where the motor travel priority mode is set as the travel mode, charge and discharge of the battery 50 is not performed. This is not essential. Charge and discharge of the battery 50 may be performed even when the hybrid vehicle 20 is driven with power from then engine 22. For example, the hybrid vehicle 20 may be driven with the driving power Pdrv* output from the engine 22 without charging and discharging the battery 50 in the case where the driving power Pdrv* is able to be output from the engine 22, and the hybrid vehicle 20 may be driven with a power able to be output from the engine 22 to be output from the engine 22 while covering the shortage of power even with the power from the engine 22 by discharging the battery 50 in the case where the driving power Pdrv* is not able to be output from the engine 22.

Figure 20:
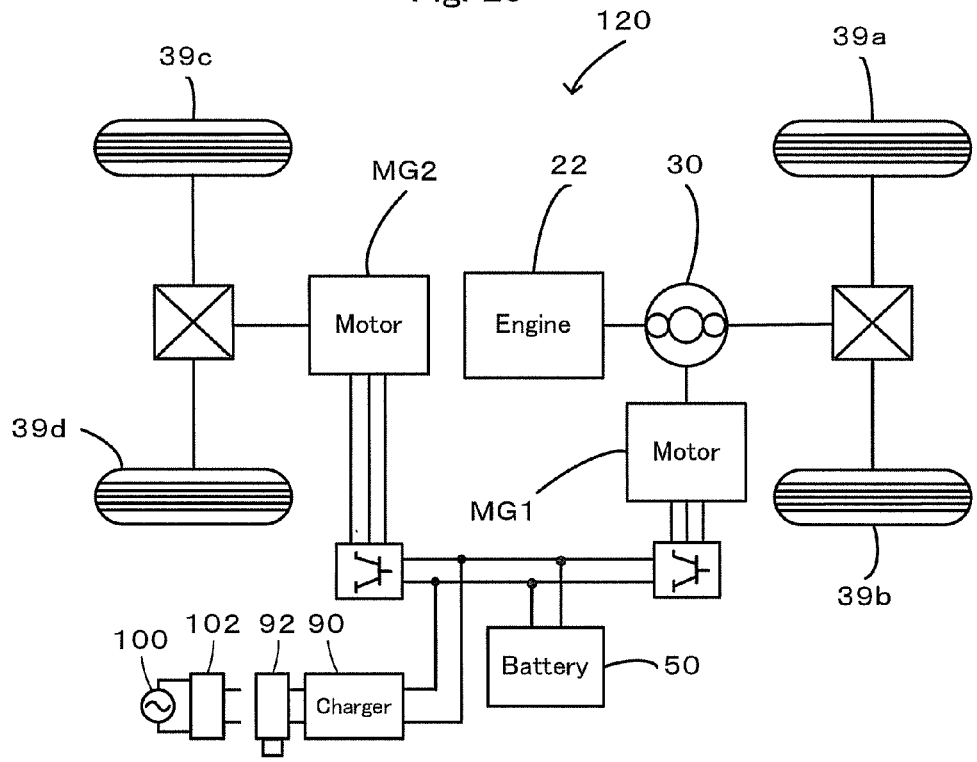
FIG. 20 schematically illustrates the configuration of another hybrid vehicle 120 in one modified example.

In the hybrid vehicle 20 of the embodiment, the power of the motor MG2 is converted by the reduction gear 35 and is output to the ring gear shaft 32*a*. The technique of the invention is also applicable to a hybrid vehicle 120 of a modified structure shown in FIG. 20. In the hybrid vehicle 120 of FIG. 20, the power of the motor MG2 is output to another axle (an axle linked with wheels 39*c* and 39*d*) that is different from the axle connecting with the ring gear shaft 32*a* (the axle linked with the drive wheels 39*a* and 39*b*).

Figure 21:
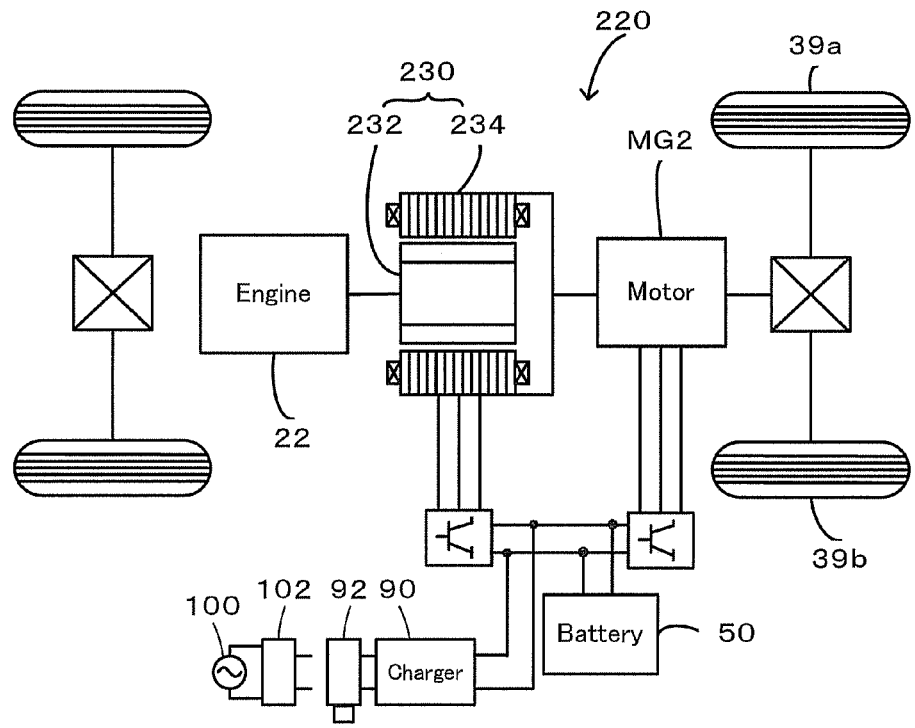
FIG. 21 schematically illustrates the configuration of still another hybrid vehicle 220 in another modified example.

In the hybrid vehicle 20 of the embodiment, the power of the engine 22 is output via the power distribution integration mechanism 30 to the ring gear shaft 32*a* or the driveshaft linked with the drive wheels 39*a* and 39*b*. The technique of the invention is also applicable to a hybrid vehicle 220 of another modified structure shown in FIG. 21. The hybrid vehicle 220 of FIG. 21 is equipped with a pair-rotor motor 230. The pair-rotor motor 230 includes an inner rotor 232 connected to the crankshaft 26 of the engine 22 and an outer rotor 234 connected to a driveshaft for outputting power to the drive wheels 39*a* and 39*b*. The pair-rotor motor 230 transmits part of the output power of the engine 22 to the driveshaft, while converting the residual engine output power into electric power.

Figure 22:
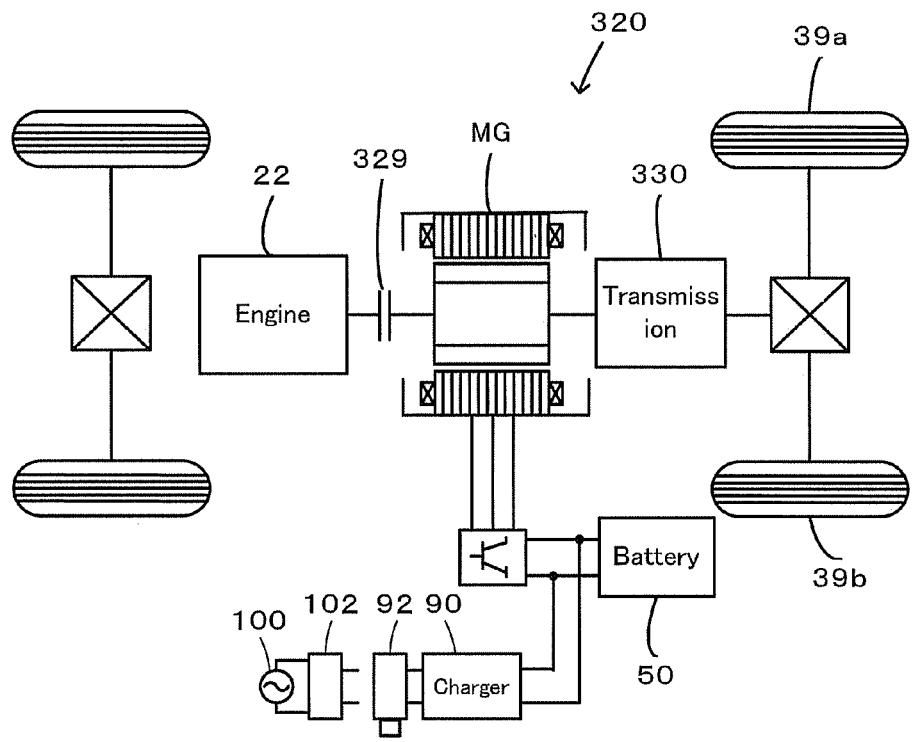
FIG. 22 schematically illustrates the configuration of another hybrid vehicle 320 in still another modified example.
Figure 23:
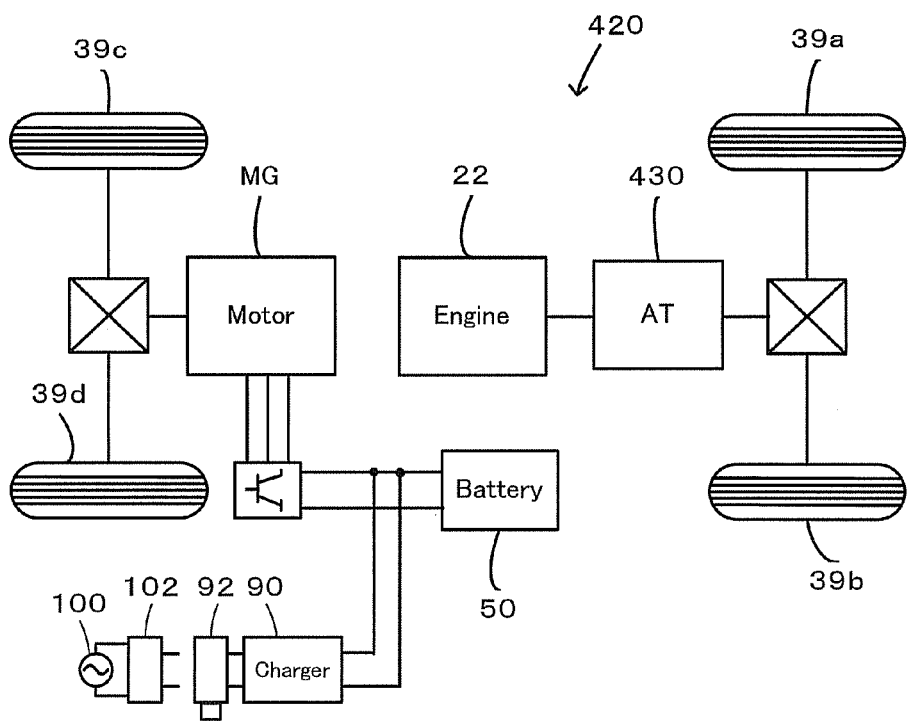
FIG. 23 schematically illustrates the configuration of another hybrid vehicle 420 in one modified example.

In the hybrid vehicle 20 of the embodiment, the power from the engine 22 is output via the power distribution integration mechanism 30 to the ring gear shaft 32*a* or the driveshaft linked to the driving wheels 39*a* and 39*b*, and the power from the motor MG2 is output via the reduction gear 35 to the ring gear shaft 32*a* or the driveshaft. The technique of the invention is also applicable to a hybrid vehicle 320 of a modified structure shown in FIG. 22. In the hybrid vehicle 320 of FIG. 22, the motor MG is attached via a transmission 330 to a driveshaft linked to the driving wheels 39*a* and 39*b* and the engine 22 is connected via a clutch 329 to the rotating shaft of the motor MG. In this hybrid vehicle 320, the power from the engine 22 is output to the driveshaft via the rotating shaft of the motor MG and the transmission 330, and the power from the motor MG is output via the transmission 330 to the driveshaft. The technique of the invention is also applicable to a hybrid vehicle 420 of a modified structure shown in FIG. 23. In the hybrid vehicle 420 of FIG. 23, the power from the engine 22 is output via a transmission 430 to the axle linked with the driving wheels 39*a* and 39*b*, and the power from the motor MG is output to another axle (an axle linked with wheels 39*c* and 39*d* of FIG. 23) that is different from the axle linked with the driving wheels 39*a* and 39*b*. That is to say, the technique of the invention is applicable to any type of hybrid vehicles having an engine that outputs power for driving the vehicle and a motor that outputs power for driving the vehicle.

In the above embodiment, the invention is described using an application to a hybrid vehicle. The invention may be applied to a control method of a hybrid vehicle.

The primary elements in the embodiment and its modified examples are mapped to the primary constituents in the claims of the invention as described below. The engine 22 in the embodiment corresponds to the 'internal combustion engine' in the claims of the invention. The motor MG2 in the embodiment corresponds to the 'motor' in the claims of the invention. The battery 50 in the embodiment corresponds to the 'secondary battery' in the claims of the invention. The charger 90 in the embodiment corresponds to the 'charger' in the claims of the invention. The hybrid electronic control unit 70 executing the processing of step S310 in the motor travel priority normal mode drive control routine of FIG. 6, the processing of step S410 in the motor travel priority restriction mode drive control routine of FIG. 7, the processing of step S510 in the motor travel priority discharge prohibition mode drive control routine of FIG. 8, and the processing of step S610 in the hybrid travel priority drive control routine of FIG. 9 corresponds to the 'driving power setting module' in the claims of the invention. At each processing, a torque demand Tr* to be output to the ring gear shaft 32*a* or the driveshaft linked with the drive wheels 39*a* and 39*b* as a torque required for the hybrid vehicle 20 is set based on the accelerator opening Acc and the vehicle speed V, and a driving power Pdrv* is set as the sum of the product of the set torque demand Tr* and the rotation speed Nr of the ring gear shaft 32*a* and a potential loss Loss. The battery ECU 52 calculating the accumulated charge ratio SOC of the battery 50 as a ratio of the accumulated charge amount dischargeable from the battery 50 to the total capacity of the battery 50 based on the integrated value of the charge-discharge current Ib measured by the current sensor 51*b* corresponds to the 'accumulated charge ratio calculation module' in the claims of the invention. The battery ECU 52 calculating the input limit Win as an allowable charging electric power to be charged in the battery 50 and the output limit Wout as an allowable discharging electric power to be discharged from the battery 50 based on the accumulated charge ratio SOC and the battery temperature Tb corresponds to the 'output limit setting module' in the claims of the invention. The hybrid electronic control unit 70 executing the travel mode setting routine of FIG. 4 corresponds to the 'mode setting module' in the claims of the invention. In the travel mode setting routine, the motor travel priority mode where the motor travel is prioritized for driving the hybrid vehicle 20 is set when the accumulated charge ration SOC of the battery 50 at the system startup is more than or equal to the threshold value Sev, and the hybrid travel priority mode where the hybrid travel is prioritized for driving the hybrid vehicle 20 is set when the accumulated charge ration SOC of the battery 50 at the system startup is less than the threshold value Sev or after the accumulated charge ratio SOC of the battery 50 reaches the threshold value Shv following the case that the accumulated charge ratio SOC of the battery 50 at the system startup is not less than the threshold value Sev. A combination of the hybrid electronic control unit 70, the engine ECU 24 that starts up the engine 22, stops operation of the engine 22, and controls the engine 22 based on the target rotation speed Ne* and the target torque Te*, and the motor ECU 40 that controls the motors MG1 and MG2 based on the torque commands Tm1* and Tm2* corresponds to the 'control module' in the claims of the invention. The hybrid electronic control unit 70 executes the processing of step S320 through S390 in the motor travel priority normal mode drive control routine of FIG. 6, the processing of step S420 through S490 in the motor travel priority restriction mode drive control routine of FIG. 7, the processing of step S520 through S586 in the motor travel priority discharge prohibition mode drive control routine of FIG. 8, and the processing of step S615 through S690 in the hybrid travel priority drive control routine of FIG. 9. In the motor travel priority mode drive control routine, in the case that the motor travel priority mode is set and the normal mode is set as the control mode, the threshold value Pstart as the obtained value (kw·Wout) from multiplying the output limit Wout of the battery 50 by the preset conversion factor kw is compared with the driving power Pdrv*. When the driving power Pdrv* is not more than the threshold value Pstart, the torque commands Tm1* and Tm2* of the motors MG1 and MG2 are set and sent to the motor ECU 40 so that the hybrid vehicle 20 is driven with the motor travel in the operation stop state of the engine 22. When the driving power Pdrv* is more than the threshold value Pstart, the target rotation speed Ne* and the target torque Te* of the engine 22 and the torque commands Tm1* and Tm2* of the motors MG1 and MG2 are set and sent to the engine ECU 24 and the motor ECU 40 so that the hybrid vehicle 20 is driven with power from the engine 22. In the motor travel priority restriction mode drive control routine, in the case that the motor travel priority mode is set and the restriction mode is set as the control mode, the threshold value Peg that is smaller value between the obtained value (kw·Wout) from multiplying the output limit Wout of the battery 50 by the preset conversion factor kw and the preset power Pset is compared with the driving power Pdrv*. When the driving power Pdrv* is not more than the threshold value Peg, the torque commands Tm1* and Tm2* of the motors MG1 and MG2 are set and sent to the motor ECU 40 so that the hybrid vehicle 20 is driven with the motor travel in the idle operation state of the engine 22. When the driving power Pdrv* is more than the threshold value Peg, the target rotation speed Ne* and the target torque Te* of the engine 22 and the torque commands Tm1* and Tm2* of the motors MG1 and MG2 are set and sent to the engine ECU 24 and the motor ECU 40 so that the hybrid vehicle 20 is driven with power from the engine 22. In the motor travel priority discharge prohibition mode drive control routine, in the case that the motor travel priority mode is set and the discharge prohibition mode is set as the control mode, the target rotation speed Ne* and the target torque Te* of the engine 22 and the torque commands Tm1* and Tm2* of the motors MG1 and MG2 are set and sent to the engine ECU 24 and the motor ECU 40 so that the hybrid vehicle 20 is driven with power from the engine 22 while the battery 50 is charged regardless of the driving power Pdrv*. In the hybrid travel priority drive control routine, the power demand Pe* as the sum of the driving power Pdrv* and the charge-discharge power demand Pb* is compared with the threshold value Pstart. When the power demand Pe* is not more than the threshold value Pstart, the torque commands Tm1* and Tm2* of the motors MG1 and MG2 are set and sent to the motor ECU 40 so that the hybrid vehicle 20 is driven with the motor travel in the operation stop state of the engine 22. When the power demand Pe* is more than the threshold value Pstart, the target rotation speed Ne* and the target torque Te* of the engine 22 and the torque commands Tm1* and Tm2* of the motors MG1 and MG2 are set and sent to the engine ECU 24 and the motor ECU 40 so that the hybrid vehicle 20 is driven with power from the engine 22.

The 'internal combustion engine' is not restricted to the engine 22 designed to consume a hydrocarbon fuel, such as gasoline or light oil, and thereby output power, but may be an internal combustion engine of any other design, for example, a hydrogen engine. The 'motor' is not restricted to the motor MG2 constructed as a synchronous motor generator but may be any other type of motor constructed to input and output power to a driveshaft, for example, an induction motor. The 'secondary battery' is not restricted to the battery 50 constructed as a lithium-ion secondary battery but may be any other type such as a nickel metal hydride secondary battery, a nickel cadmium secondary battery, and a lead acid secondary battery. The 'charger' is not restricted to the charger 90 including a charging relay, an AC-to-DC converter, and a DC-to-DC converter but may be any other type that is connected to an external power supply in a system-off state of the hybrid vehicle to charge the secondary battery with electric power from the external power supply. The 'driving power setting module' is not restricted to the arrangement of setting a torque demand Tr* to be output to the ring gear shaft 32a or the driveshaft linked with the drive wheels 39a and 39b as a torque required for the hybrid vehicle 20 based on the accelerator opening Acc and the vehicle speed V, and a driving power Pdrv* as the sum of the product of the set torque demand Tr* and the rotation speed Nr of the ring gear shaft 32a and a potential loss Loss. The 'driving power setting module' may be any other arrangement of setting a driving power required for driving the hybrid vehicle, for example, an arrangement of setting a driving power based on the accelerator opening Acc and the vehicle speed V without setting a torque demand, an arrangement of setting a torque demand based only on the accelerator opening Acc and setting a driving power based on the set torque demand Tr*, an arrangement of setting a torque demand based on a location of the vehicle on a preset drive route and setting a driving power based on the set torque demand Tr*, and an arrangement of setting a driving power based on a location of the vehicle on a preset drive route without setting a torque demand. The 'accumulated charge ratio calculation module' is not restricted to the arrangement of calculating the accumulated charge ratio SOC of the battery 50 as a ratio of the accumulated charge amount dischargeable from the battery 50 to the total capacity of the battery 50 based on the integrated value of the charge-discharge current Ib measured by the current sensor 51b. The 'accumulated charge ratio calculation module' may be any other arrangement of calculating an accumulated charge ratio based on a state of the secondary battery, the accumulated charge ratio being a ratio of an accumulated charge amount in the secondary battery to a whole capacity of the secondary battery, for example, an arrangement of measuring an open-circuit voltage of a battery to calculate the accumulated charge ratio SOC of the battery based on the measured open-circuit voltage. The 'output limit setting module' is not restricted to the arrangement of calculating the input limit Win as an allowable charging electric power to be charged in the battery 50 and the output limit Wout as an allowable discharging electric power to be discharged from the battery 50 based on the accumulated charge ratio SOC and the battery temperature Tb. The 'output limit setting module' may be any other arrangement of setting an output limit of the secondary battery as a maximum allowable electric power to be output from the secondary battery based on the state of the secondary battery. The 'mode setting module' is not restricted to the arrangement that, in the travel mode setting routine, the motor travel priority mode where the motor travel is prioritized for driving the hybrid vehicle 20 is set when the accumulated charge ration SOC of the battery 50 at the system startup is more than or equal to the threshold value Sev, and the hybrid travel priority mode where the hybrid travel is prioritized for driving the hybrid vehicle 20 is set when the accumulated charge ration SOC of the battery 50 at the system startup is less than the threshold value Sev or after the accumulated charge ratio SOC of the battery 50 reaches the threshold value Shv following the case that the accumulated charge ratio SOC of the battery 50 at the system startup is not less than the threshold value Sev. The 'mode setting module' may be any other arrangement of, in a case that the calculated accumulated charge ratio is at least more than or equal to a first preset ratio upon system-on of the hybrid vehicle, setting a motor travel priority mode where the motor travel is prioritized for driving the hybrid vehicle until the calculated accumulated charge ratio becomes less than a second preset ratio that is less than the first preset ratio during vehicle traveling, while setting a hybrid travel priority mode where the hybrid travel is prioritized for driving the hybrid vehicle in a case that the motor travel priority mode is not set.

The 'control module' is not restricted to the combination of the hybrid electronic control unit 70 with the engine ECU 24 and the motor ECU 40 but may be actualized by a single electronic control unit. The 'controller' is not restricted to the arrangement described below. In the case that the motor travel priority mode is set and the normal mode is set as the control mode, the threshold value Pstart as the obtained value (kw·Wout) from multiplying the output limit Wout of the battery 50 by the preset conversion factor kw is compared with the driving power Pdrv*. The engine 22 and the motors MG1 and MG2 are controlled so that the hybrid vehicle 20 is driven with the motor travel in the operation stop state of the engine 22 when the driving power Pdrv* is not more than the threshold value Pstart, and they are controlled so that the hybrid vehicle 20 is driven with power from the engine 22 when the driving power Pdrv* is more than the threshold value Pstart. In the case that the motor travel priority mode is set and the restriction mode is set as the control mode, the threshold value Peg that is smaller value between the obtained value (kw·Wout) from multiplying the output limit Wout of the battery 50 by the preset conversion factor kw and the preset power Pset is compared with the driving power Pdrv*. The engine 22 and the motors MG1 and MG2 are controlled so that the hybrid vehicle 20 is driven with the motor travel in the idle operation state of the engine 22 when the driving power Pdrv* is not more than the threshold value Peg, and they are controlled so that the hybrid vehicle 20 is driven with power from the engine 22 when the driving power Pdrv* is more than the threshold value Peg. In the case that the motor travel priority mode is set and the discharge prohibition mode is set as the control mode, the engine 22 and the motors MG1 and MG2 are controlled so that the hybrid vehicle 20 is driven with power from the engine 22 while the battery 50 is charged regardless of the driving power Pdrv*. In the case that the hybrid travel priority mode is set, the power demand Pe* as the sum of the driving power Pdrv* and the charge-discharge power demand Pb* is compared with the threshold value Pstart. The engine 22 and the motors MG1 and MG2 are controlled so that the hybrid vehicle 20 is driven with the motor travel in the operation stop state of the engine 22 when the power demand Pe* is not more than the threshold value Pstart, and they are controlled so that the hybrid vehicle 20 is driven with power from the engine 22 when the power demand Pe* is more than the threshold value Pstart. The 'control module' may be any other arrangement of, in a case that the motor travel priority mode is set and a preset condition for restricting the motor travel is not satisfied, controlling the motor so that the hybrid vehicle is driven with the motor travel on condition that the set driving power is not more than the set output limit of the secondary battery, while controlling the internal combustion engine and the motor so that the hybrid vehicle is driven with the hybrid travel on condition that the set driving power is more than the set output limit of the secondary battery, and in a case that the motor travel priority mode is set and the preset condition is satisfied, controlling the motor so that the hybrid vehicle is driven with the motor travel on condition that the set driving power is not more than a threshold power that is a smaller power between the set output limit of the secondary battery and a predetermined power, while controlling the internal combustion engine and the motor so that the hybrid vehicle is driven with the hybrid travel on condition that the set driving power is more than the threshold power. As one example of arrangement, in the case that the motor travel priority mode is set and the restriction mode is set as the control mode, the engine 22 and the motors MG1 and MG2 are controlled so that the hybrid vehicle 20 is driven with the motor travel in the idle operation state of the engine 22 when the driving power Pdrv* is not more than the threshold value Peg, and they are controlled so that the hybrid vehicle 20 is driven with an output power obtained from subtracting the threshold value Peg from the driving power Pdrv* from the engine 22 while covering the corresponding power to the threshold value Peg by discharging the battery 50 when the driving power Pdrv* is more than the threshold value Peg. As another example of arrangement, in the case that the motor travel priority mode is set and the discharge prohibition mode is set as the control mode, the engine 22 and the motors MG1 and MG2 are controlled so that the hybrid vehicle 20 is driven with power from the engine 22 without charging the battery 50 when the output limit Wout of the battery 50 is extremely smaller than ordinary values and discharge of the battery 50 is prohibited or when the defroster switch is on for ensuring the driver's visibility. As still another example of arrangement, in the case that the motor travel priority mode is set and the normal mode or the restriction mode is set as the control mode, the engine 22 and the motors MG1 and MG2 are controlled so that the hybrid vehicle 20 is driven with power from the engine 22 with charge and discharge of the battery 50.

The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

There may be many other modifications, changes, and alterations without departing from the scope or spirit of the main characteristics of the present invention.

INDUSTRIAL APPLICABILITY

The technique of the invention is preferably applied to the manufacturing industries of the hybrid vehicles.

The invention claimed is:

1. A hybrid vehicle, having an internal combustion engine capable of outputting power for driving the hybrid vehicle, a motor constructed to input and output power for driving the hybrid vehicle, and a secondary battery designed to transmit electric power to and from the motor, the hybrid vehicle being capable of motor travel where the hybrid vehicle is driven only with input and output power to and from the motor and hybrid travel where the hybrid vehicle is driven with output power from the internal combustion engine regardless of charge and discharge of the battery, the hybrid vehicle comprising:

a charger connected to an external power supply in a system-off state of the hybrid vehicle to charge the secondary battery with electric power from the external power supply;

a driving power setting module that sets a driving power required for driving the hybrid vehicle;

an accumulated charge ratio calculation module that calculates an accumulated charge ratio based on a state of the secondary battery, the accumulated charge ratio being a ratio of an accumulated charge amount in the secondary battery to a whole capacity of the secondary battery;

an output limit setting module that sets an output limit of the secondary battery as a maximum allowable electric power to be output from the secondary battery based on the state of the secondary battery;

a mode setting module that, in a case that the calculated accumulated charge ratio is at least more than or equal to a first preset ratio upon system-on of the hybrid vehicle, sets a motor travel priority mode where the motor travel is prioritized for driving the hybrid vehicle until the calculated accumulated charge ratio becomes less than a second preset ratio that is less than the first preset ratio during vehicle traveling, while setting a hybrid travel priority mode where the hybrid travel is prioritized for driving the hybrid vehicle in a case that the motor travel priority mode is not set; and a control module that, in a case that the motor travel priority mode is set and a preset condition for restricting the motor travel is not satisfied, controls the motor so that the hybrid vehicle is driven with the motor travel when the set driving power is not more than the set output limit of the secondary battery, while controlling the internal combustion engine and the motor so that the hybrid vehicle is driven with the hybrid travel when the set driving power is more than the set output limit of the secondary battery, and in a case that the motor travel priority mode is set and the preset condition is satisfied, the control module controlling the motor so that the hybrid vehicle is driven with the motor travel when the set driving power is not more than a threshold power that is a smaller power between the set output limit of the secondary battery and a predetermined power, while controlling the internal combustion engine and the motor so that the hybrid vehicle is driven with the hybrid travel when the set driving power is more than the threshold power, wherein the control module, in the case that the motor travel priority mode is set and the preset condition is satisfied on condition that the set driving power is more than the threshold power, controls the internal combustion engine and the motor so that the hybrid vehicle is driven with the hybrid travel and the set driving power is output from the internal combustion engine when the set driving power is able to be output from the internal combustion engine, while controlling the internal combustion engine and the motor so that the hybrid vehicle is driven with the hybrid travel and the set driving power is output from the internal combustion engine together with the motor when the set driving power is not able to be output from the internal combustion engine, wherein the preset condition is a condition that an operation of the internal combustion engine is requested, and the control module, in the case that the motor travel priority mode is set an the preset condition is satisfied on condition that the set driving poser is not more than the threshold power, controls the internal combustion engine and the motor so that the hybrid vehicle is driven with the motor travel and the internal combustion is in idle operation.

2. The hybrid vehicle in accordance with claim 1, wherein the preset condition is a condition that is satisfied when any one of three conditions is satisfied, a condition for operating the internal combustion engine to heat a cabin, a condition for operating the internal combustion engine to heat a catalyst of a catalytic conversion unit attached to an exhaust system of the internal combustion engine, and a condition for operating the internal combustion engine to warm up the internal combustion engine.

3. The hybrid vehicle in accordance with claim 1, wherein the predetermined power is a power that, when performing the motor travel for a preset distance with, the accumulated charge ratio becomes the second preset ratio from a fully charged state of the secondary battery.

4. The hybrid vehicle in accordance with claim 1, wherein the control module, in a case that the hybrid travel priority mode is set and a prohibition condition for prohibiting discharge from the secondary battery is satisfied, controls the internal combustion engine so that the hybrid vehicle is driven only with output power from the internal combustion engine.

5. The hybrid vehicle in accordance with claim 4, the prohibition condition is a condition that is satisfied when any one of three conditions is satisfied, a condition for performing forced charge of the secondary battery, a condition that a defroster switch is on for ensuring driver's visibility, and a condition that the set output limit of the secondary battery is not more than a preset limit predetermined as an extremely smaller value than ordinary values.

6. The hybrid vehicle in accordance with claim 1, wherein the hybrid vehicle further comprising:

a generator constructed to input and output power and transmit electric power to and from the secondary battery; and a planetary gear mechanism with three elements each connected to three shafts, an output shaft of the internal combustion engine, a rotating shaft of the generator, and a driveshaft linked to an axle of the hybrid vehicle, wherein the control module controls the generator for operation control of the internal combustion engine.

7. A control method of a hybrid vehicle having an internal combustion engine capable of outputting power for driving the hybrid vehicle, a motor constructed to input and output power for driving the hybrid vehicle, a secondary battery designed to transmit electric power to and from the motor, and a charger connected to an external power supply in a system-off state of the hybrid vehicle to charge the secondary battery with electric power from the external power supply, the hybrid vehicle being capable of motor travel where the hybrid vehicle is driven only with input and output power to and from the motor and hybrid travel where the hybrid vehicle is driven with output power from the internal combustion engine regardless of charge and discharge of the battery, the control method comprising:

in a case that a motor travel priority mode where the motor travel is prioritized for driving the hybrid vehicle is set and a preset condition for restricting the motor travel is not satisfied, controlling the motor so that the hybrid vehicle is driven with the motor travel when a driving power required for driving the hybrid vehicle is not more than an output limit of the secondary battery as a maximum allowable electric power to be output from the secondary battery, while controlling the internal combustion engine and the motor so that the hybrid vehicle is driven with the hybrid travel when the driving power is more than the output limit of the secondary battery, and in a case that the motor travel priority mode is set and the preset condition is satisfied, controlling the motor so that the hybrid vehicle is driven with the motor travel when the driving power is not more than a threshold power that is a smaller power between the output limit of the secondary battery and a predetermined power, while controlling the internal combustion engine and the motor so that the hybrid vehicle is driven with the hybrid travel when the driving power is more than the threshold power, wherein the motor travel priority mode is set according to an accumulated charge ratio being at least more than or equal to a first preset ratio upon system-on of the hybrid vehicle until the accumulated charge ratio becomes less than a second preset ratio that is less than the first preset ratio during vehicle traveling, the accumulated charge ratio being a ratio of an accumulated charge amount in the secondary battery to a whole capacity of the secondary battery, wherein the control method, in the case that the motor travel priority mode is set and the preset condition is satisfied on condition that the driving power is more than the threshold power, controlling the internal combustion engine and the motor so that the hybrid vehicle is driven with the hybrid travel and the driving power is output from the internal combustion engine when the driving power is able to be output from the internal combustion engine, while controlling the internal combustion engine and the motor so that the hybrid vehicle is driven with the hybrid travel and the driving power is output from the internal combustion engine together with the motor when the driving power is not able to be output from the internal combustion engine, wherein the preset condition is a condition that an operation of the internal combustion engine is requested, and the control method, in the case that the motor travel priority mode is set an the preset condition is satisfied on condition that the set driving poser is not more than the threshold power, controls the internal combustion engine and the motor so that the hybrid vehicle is driven with the motor travel and the internal combustion is in idle operation.

8. The control method of the hybrid vehicle in accordance with claim 7, wherein the control method, in a case that the hybrid travel priority mode is set and a prohibition condition for prohibiting discharge from the secondary battery is satisfied, controlling the internal combustion engine so that the hybrid vehicle is driven only with output power from the internal combustion engine.

\* \* \* \* \*

UNITED STATES PATENT AND TRADEMARK OFFICE
CERTIFICATE OF CORRECTION

| | | |
|---|---|---|
| PATENT NO. | : 8,909,399 B2 | Page 1 of 1 |
| APPLICATION NO. | : 13/322340 | |
| DATED | : December 9, 2014 | |
| INVENTOR(S) | : Norihiko Kato et al. | |

It is certified that error appears in the above-identified patent and that said Letters Patent is hereby corrected as shown below:

In the Claims

At column 30, line 6, claim 1, change "is set an the" to -- is set and the --.

At column 32, line 16, claim 7, change "is set an the" to -- is set and the --.

Signed and Sealed this
Twenty-second Day of September, 2015

Michelle K. Lee
*Director of the United States Patent and Trademark Office*